US011954517B2

(12) United States Patent
Chennoor

(10) Patent No.: US 11,954,517 B2
(45) Date of Patent: Apr. 9, 2024

(54) COMPUTER-IMPLEMENTED METHOD AND SYSTEM FOR PROVIDING DYNAMIC ENDPOINTS FOR PERFORMING DATA TRANSACTIONS

(71) Applicant: Visa International Service Association, San Francisco, CA (US)

(72) Inventor: Sai Nikhil Chennoor, Warangal (IN)

(73) Assignee: Visa International Service Association, San Francisco, CA (US)

( * ) Notice: Subject to any disclaimer, the term of this patent is extended or adjusted under 35 U.S.C. 154(b) by 529 days.

(21) Appl. No.: 17/307,113

(22) Filed: May 4, 2021

(65) Prior Publication Data
US 2022/0357979 A1 Nov. 10, 2022

(51) Int. Cl.
*G06F 9/46* (2006.01)
*G06F 9/50* (2006.01)
*G06F 9/54* (2006.01)

(52) U.S. Cl.
CPC .............. *G06F 9/466* (2013.01); *G06F 9/505* (2013.01); *G06F 9/541* (2013.01)

(58) Field of Classification Search
None
See application file for complete search history.

(56) References Cited

U.S. PATENT DOCUMENTS

| 6,253,257 | B1 | 6/2001 | Dundon |
| 9,098,346 | B2 | 8/2015 | Robb et al. |
| 9,560,121 | B2 | 1/2017 | Aslam et al. |
| 9,846,905 | B2 * | 12/2017 | Katzin ................. G06Q 20/40 |
| 10,387,146 | B2 * | 8/2019 | Sukhija ................ H04L 67/565 |
| 10,623,476 | B2 * | 4/2020 | Thompson ........... H04L 67/561 |
| 11,023,293 | B2 * | 6/2021 | Rodriguez Sierra ... G06F 16/84 |
| 11,308,485 | B2 * | 4/2022 | Gomes ................. H04W 12/06 |
| 11,381,564 | B2 * | 7/2022 | K ........................... H04L 63/08 |
| 11,469,878 | B2 * | 10/2022 | Shpurov ................. H04L 9/30 |
| 2007/0180493 | A1 | 8/2007 | Croft et al. |
| 2011/0225074 | A1 * | 9/2011 | Khosravy ............ G06Q 10/10 715/810 |
| 2017/0161486 | A1 * | 6/2017 | Jeon ..................... H04L 63/067 |
| 2018/0075158 | A1 * | 3/2018 | Li ........................ G06F 16/9024 |
| 2019/0140921 | A1 * | 5/2019 | Xu ....................... H04W 28/16 |
| 2019/0158576 | A1 * | 5/2019 | Palladino ............... H04L 67/10 |

FOREIGN PATENT DOCUMENTS

WO 2016144304 A1 9/2016

* cited by examiner

*Primary Examiner* — Hiren P Patel
(74) *Attorney, Agent, or Firm* — The Webb Law Firm

(57) ABSTRACT

The present disclosure relates to Application Programming Interface (API) framework that discloses a computer implemented method, polling service system, and non-transitory computer readable medium for providing dynamic endpoints for performing data transactions with a corresponding candidate application server. The method has two phases: a polling phase and a transaction phase. In the polling phase, the polling service system receives a first API request from one or more source devices and provides a dynamic endpoint for the one or more source devices to interact with the corresponding candidate application server of their requirement. In the transaction phase, the corresponding candidate application server receives a second API request from the one or more source devices through the dynamic endpoint generated during the polling phase, and performs data transactions.

17 Claims, 11 Drawing Sheets

```
{
    "deviceId": "00000000-89BBCDEF-0121567-89ABCZEF",
    "ipAddress": "0.0.0.0",
    "ipLatitude": "17.37528",
    "ipLongitude": "78.47444",
    "deviceScore": "64",
    "deviceType": "iOS",
    "token": "21nfGsAu672JAbd",
    "productId": "aelec802feac4623a39ed1f209d442e3",
    "actionCode": "4710cf2beaaf4d6482335fda340f1bcc",
    "userId": "127gABu261LKaf",
    "preAddressId": "AhpLQAdezq4qQ6daGAg35yaSHG3mb9q"
}
```

FIGURE 2B

```
{
"second endpoint":
"www.visa.com/e055e/4710cf2beaaf4d6482335fda340f1bcc/9cf1650d-3eee-44ffa5a4-bf9b7c446777",
"token": "18PgBBu463LMae",
"inputFields":
"ADDRESS_LINE_1,ADDRESS_LINE_2,CITY,STATE,COUNTRY,PIN_CODE",
"encryptionKey": "whpJQkduz6E3qQZdJGAK35yxSHG3mb9q"
}
```

FIGURE 2C

```
{
    "ADDRESS_LINE_1": "Aquamarine building, L 4 & 5 Bagmane WTC",
    "ADDRESS_LINE_2": "Mahadevpura, Dodanakundhi",
    "CITY": "Bengaluru",
    "STATE": "Karnataka",
    "COUNTRY": "India",
    "PIN_CODE": "560048"
}
```

FIGURE 2D

```
{
"ADDRESS_LINE_1":
"saolYFcRd40B79uRcArsVJubJ0weRvDFM3CNBaSHrD2Dkqb+1Z48ctWyboRzd
bxdCZa1s9k8Tnc8WQIVO3mmhg==",
"ADDRESS_LINE_2":
"3ghGzwnDVhel/iaWOcrpFSrQ4f0K0U7FL8z+M+47UAo=",
"CITY": "tpsulgmK+PZpo+KBKQ8zjMl1/ZAwJviOl0yr6R9pKQc=",
"STATE": "HBea5HBxAtk0Pls26vEISSp6jQo6gU8ydki5fS4I9y0=",
"COUNTRY": "7rlLUAFNZVbOnZtsAYpZvoaANJYTDN6drmziacwNA/0=",
"PIN_CODE": "RNiU5A2D5KAKGesh5FTJKJPkGcinvq5NCACMcZHPRAo="
}
```

FIGURE 2E

```
{
    "deviceId": "00000000-89BBCDEF-0121567-89KMNGJFU",
    "ipAddress": "0.0.0.0",
    "ipLatitude": "17.37596",
    "ipLongitude": "98.47467",
    "deviceScore": "58",
    "deviceType": "iOS",
    "token": "5A3rHT#",
    "productId": "ae1ec802feac4623a39ed1f209d442e3",
    "actionCode": "4710cf2beaaf4d6482335fda340f1bcc",
    "userId": "127gABu261LKaf",
    "preAddressId": "AhpLQAdezq4qQ6daGAg35yaSHG3mb9q"
}
```

FIGURE 2G

```
{
    "deviceId": "00000000-40AACHDEF-0141567-70PQRMLN",
    "ipAddress": "0.0.0.1",
    "ipLatitude": "19.86789",
    "ipLongitude": "90.56732",
    "deviceScore": "70",
    "deviceType": "iOS",
    "token": "812RG56#",
    "productId": "p11qcc934klmnd5929p50kb3d589d996n7",
    "actionCode": "8845djhks3904tu0nwlkwd39045y0103u29dnkdn9",
    "userId": "456945Ubg261PAgh",
    "preAddressId": "Apspdkf1203ukdnn78y2401290fjdb924"
}
```

FIGURE 2H

```
{
"endpoint 1":
"www.visa.com/e055e/4710cf2beaaf4d6482335fda340f1bcc/9cf1650d-3eee-
44ffa5a4-bf9b7c446777",
"token": "18PgBBu463LMae",
"inputFields":
"ADDRESS_LINE_1,ADDRESS_LINE_2,CITY,STATE,COUNTRY,PIN_COD
E",
"encryptionKey": "whpJQkduz6E3qQZdJGAK35yxSHG3mb9q"
}
```

FIGURE 2I

```
{
"endpoint 2":"www.visa.com/e0778/8934pf2hffe4j679334rj2ncc/9cf1650d-3eee-
44ffa5a4-Dwf345u5h45999",
"token": "567899DH56hfaq",
"inputFields":
"ADDRESS_LINE_1,ADDRESS_LINE_2,CITY,STATE,COUNTRY,PIN_COD
E",
"encryptionKey": "lspfoefhtfnJGCHHjndwdnfc920aehfb9054i"
}
```

FIGURE 2J

```
{
"ADDRESS_LINE_1": "Lotus building, A4 & 5 Tech Park",
"ADDRESS_LINE_2": "Cambridge layout, R K Nagar",
"CITY": "Bengaluru",
"STATE": "Karnataka",
"COUNTRY": "India",
"PIN_CODE": "560897"
}
```

FIGURE 2K

```
{
"ADDRESS_LINE_1": "Heritage building, A-314 Block B",
"ADDRESS_LINE_2": "Madapur",
"CITY": "Hyderabad",
"STATE": "Telangana",
"COUNTRY": "India",
"PIN_CODE": "500081"
}
```

FIGURE 2L

```
{
"ADDRESS_LINE_1":
"fhg0lhfgyRdA0B79uRcArsVJubJ0weRvHJU45KDvn7Hslmd+1Z48ctWyboRz
dbxdCZals9k8UVDHr56IVO3rrTG==",
"ADDRESS_LINE_2":
"3ghGzwnDVhel/iaWOcrpFSrQ4f0K0U7FL8z+M+687DH=",
"CITY": "cvhgrJK+PZpo+KBKQ8zjMll/ZAwJviOl0yr6R9pKQc=",
"STATE": "RHght786lsfAtk0Pls26vEISSp6jQo6gU8ydki5fS4I9y0=",
"COUNTRY": "5yJFH78FEabOnZtsAYpZvoaANJYTDN6drmziacwNA/0=",
"PIN_CODE":
"GHR567KSfhtlhGesh5FTJKJPkGcinvq5NCACMcZHPRAo="
}
```

FIGURE 2M

```
{
"ADDRESS_LINE_1":
"KDiqejwoptkyj,hHSdb9uRcArsVJubJ0weRvDFM3CNBaSHrD2Dkqb+1Z48ct
WyboRzdbxdCZals9k8Tn9WDSHIFG9948577==",
"ADDRESS_LINE_2":
"45ghDFJUwdopefnf,rDK0H87DKFfngjktr+G+498Ao=",
"CITY": "zpfghuGnKf+FGjn+NGFHskditgnwll4fht78JFGH+96HF=",
"STATE": "JDGskdjt68HGdoefkldml34kzfjruifjslKIFHG9H67=",
"COUNTRY": "8DKEndwkKSD968b7ldDJFHrtikldNGHF7=",
"PIN_CODE": "RHGITUNDIFGNjughtKLDFn1945Djr06="
}
```

FIGURE 2N

COMPUTER-IMPLEMENTED METHOD AND SYSTEM FOR PROVIDING DYNAMIC ENDPOINTS FOR PERFORMING DATA TRANSACTIONS

BACKGROUND

1. Technical Field

The present disclosure relates to Application Programming Interface (API) framework. Particularly, but not exclusively, the present disclosure relates to a computer-implemented method and system for providing dynamic endpoints for performing data transactions.

2. Technical Considerations

Generally, there is a lack of adoption of new technologies due to the presence of legacy codes. Significant updates may not be allowed to such legacy codes, due to which developers cannot experiment with new features or bug fixes in a production environment. Any updates which are carried out to such legacy codes which use APIs that are used worldwide may affect every external device consuming such APIs. Therefore, currently at any given point of time, there is only one version of the legacy code that would be available to process each input request. This in turn restricts the developers from frequently changing input data associated with such endpoints as well, due to tight coupling of such input data with external devices worldwide.

Moreover, currently the endpoint used for API calls is a static endpoint which is exposed to the external environment. Such static endpoints become an easy target for attackers (unauthorized users, hackers) to attack data sources which can be reached via the static endpoints, thereby leading to compromise on confidential data. Thus, currently there is no framework which solves the technical problem of static endpoints which is prone to attacks, leading to data security issues.

Therefore, currently, there exists a need for a method and a system which allows the developers to introduce new versions of codes that allow experimenting with new features and bug fixes associated with the legacy codes. Also, there exists a need for addressing the data security issues which are caused due to the usage of static endpoints for receiving input requests.

The information disclosed in this background of the disclosure section is only for enhancement of understanding of the general background of the disclosure and should not be taken as an acknowledgement or any form of suggestion that this information forms the existing art already known to a person skilled in the art.

SUMMARY

Additional features and advantages are realized through the techniques of the present disclosure. Other embodiments and aspects of the disclosure are described in detail herein and are considered a part of the claimed disclosure.

In non-limiting embodiments or aspects, provided is a computer-implemented method comprising: receiving, by a polling service system, a first Application Programming Interface (API) request from one or more source devices through a first endpoint, wherein the first API request indicates requirement of the one or more source devices to perform one or more data transactions with a corresponding candidate application server; parsing, by the polling service system, the first API request of each of the one or more source devices to identify the requirement of the one or more source devices; generating, by the polling service system, a unique first response for each of the one or more source devices based on the requirement corresponding to the one or more source devices, wherein the unique first response generated for each of the one or more source devices comprises a unique second endpoint that facilitates the one or more data transactions with the corresponding candidate application server; and transmitting, by the polling service system, the unique first response generated for each of the corresponding one or more source devices, wherein each of the one or more source devices use the corresponding unique second endpoint to perform the one or more data transactions with the corresponding candidate application server.

In some non-limiting embodiments or aspects, the one or more source devices are validated prior to generation of the unique first response. In some non-limiting embodiments or aspects, the unique first response further comprises at least one of the following: parameters required for performing the one or more data transactions with the corresponding candidate application server and a unique transaction token for validation purposes, an encryption key, one or more input fields for an API call, or any combination thereof.

In some non-limiting embodiments or aspects, the computer-implemented method further comprises storing, by the polling service system, intimation information corresponding to each of the generated unique first responses, wherein the intimation information comprises a unique transaction token provided to the one or more source devices for validation purposes, and at least one of the following: an identifier of the one or more source devices, details of the unique second endpoint to be provided to the one or more source devices, an identifier of the corresponding candidate application server that the one or more source devices are allowed to access through the unique second endpoint, or any combination thereof.

In some non-limiting embodiments or aspects, the unique second endpoint is dynamically generated in response to each of the first API requests based on one or more predefined rules, wherein the one or more predefined rules are related to at least one of the following: a version of a corresponding candidate application facilitating the corresponding candidate application server, criticality of the requirement of the one or more source devices, geographic location of the one or more source devices, validity time of the unique second endpoint, or any combination thereof.

In some non-limiting embodiments or aspects, the first API request comprises at least one of the following: a device Identifier (ID) of the one or more source devices, an Internet Protocol (IP) address associated with the one or more source devices, latitude and longitude associated with the IP address, a device score, a device type, an initial base token, a product ID, action code, user ID, pre-address ID, metadata required to complete the one or more data transactions, or any combination thereof.

In some non-limiting embodiments or aspects, the computer-implemented method further comprises: receiving, by the corresponding candidate application server, a second API request from the one or more source devices through the corresponding unique second endpoint, wherein the second API request comprises parameters and metadata required for performing the one or more data transactions with the corresponding candidate application server; validating, by the corresponding candidate application server, if the one or more source devices are trusted sources, and if the second API request received through the corresponding unique second endpoint is a valid request; and transmitting, by the corresponding candidate application server, upon successful validation, a second response to the one or more source devices, through the corresponding unique second endpoint, wherein the second response is generated upon performing the one or more data transactions comprising at least one of the following: data retrieval, modification of data elements, addition of data elements, deletion of data elements, replacement of data elements, or any combination thereof, and wherein the second response comprises at least one of acknowledgement related to the one or more data transactions and data related to the one or more data transactions.

In some non-limiting embodiments or aspects, the validating comprises: retrieving, by the corresponding candidate application server, intimation information related to the corresponding candidate application server from a polling database associated with the polling service system; and comparing, by the corresponding candidate application server, the intimation information with a corresponding unique transaction token present in the second API request of the one or more source devices to determine a match. In some non-limiting embodiments or aspects, the computer-implemented method further comprises performing one of accepting or rejecting, by the corresponding candidate application server, the second API request, if the comparison determines the match or a mismatch, respectively.

In non-limiting embodiments or aspects, provided is a polling service system comprising: a processor; and a memory communicatively coupled to the processor, wherein the memory stores processor instructions, which, on execution, causes the processor to: receive a first Application Programming Interface (API) request from one or more source devices through a first endpoint, wherein the first API request indicates requirement of the one or more source devices to perform one or more data transactions with a corresponding candidate application server; parse the first API request of each of the one or more source devices to identify the requirement of the one or more source devices; generate a unique first response for each of the one or more source devices based on the requirement corresponding to the one or more source devices, wherein the unique first response generated for each of the one or more source devices comprises a unique second endpoint that facilitates the one or more data transactions with the corresponding candidate application server; and transmit the unique first response generated for each of the corresponding one or more source devices, wherein each of the one or more source devices use the corresponding unique second endpoint to perform the one or more data transactions with the corresponding candidate application server.

In some non-limiting embodiments or aspects, the one or more source devices are validated prior to generation of the unique first response. In some non-limiting embodiments or aspects, the unique first response further comprises at least one of the following: parameters required for performing the one or more data transactions with the corresponding candidate application server and a unique transaction token for validation purposes, an encryption key, one or more input fields for an API call, or any combination thereof.

In some non-limiting embodiments or aspects, the processor is further configured to store intimation information corresponding to each of the generated unique first responses, wherein the intimation information comprises a unique transaction token provided to the one or more source devices for validation purposes, and at least one of the following: an identifier of the one or more source devices, details of the unique second endpoint to be provided to the one or more source devices, an identifier of the corresponding candidate application server that the one or more source devices are allowed to access through the unique second endpoint, or any combination thereof.

In some non-limiting embodiments or aspects, the processor generates the unique second endpoint dynamically in response to each of the first API requests based on one or more predefined rules, wherein the one or more predefined rules are related to at least one of the following: a version of a corresponding candidate application facilitating the corresponding candidate application server, criticality of the requirement of the one or more source devices, geographic location of the one or more source devices, validity time of the unique second endpoint, or any combination thereof.

In some non-limiting embodiments or aspects, the first API request comprises at least one of the following: a device Identifier (ID) of the one or more source devices, an Internet Protocol (IP) address associated with the one or more source devices, latitude and longitude associated with the IP address, a device score, a device type, an initial base token, a product ID, action code, user ID, pre-address ID, metadata required to complete the one or more data transactions, or any combination thereof.

In some non-limiting embodiments or aspects, the corresponding candidate application server associated with the polling service system is configured to: receive a second API request from the one or more source devices through the corresponding unique second endpoint, wherein the second API request comprises parameters and metadata required for performing the one or more data transactions with the corresponding candidate application server; validate: if the one or more source devices are trusted sources, and if the second API request received through the corresponding unique second endpoint is a valid request; and transmit, upon successful validation, a second response to the one or more source devices, through the corresponding unique second endpoint, wherein the second response is generated upon performing the one or more data transactions comprising at least one of the following: data retrieval, modification of data elements, addition of data elements, deletion of data elements, replacement of data elements, or any combination thereof, and wherein the second response comprises at least one of acknowledgement related to the one or more data transactions and data related to the one or more data transactions.

In some non-limiting embodiments or aspects, to validate, the corresponding candidate application server is configured to: retrieve intimation information related to the corresponding candidate application server from a polling database associated with the polling service system; and compare the intimation information with a corresponding unique transaction token present in the second API request of the one or more source devices to determine a match. In some non-limiting embodiments or aspects, the corresponding candidate application server performs one of accepting or rejecting the second API request if the comparison determines the match or a mismatch, respectively.

In non-limiting embodiments or aspects, provided is a non-transitory computer-readable medium including instructions stored thereon that when processed by at least one processor, causes a polling service system to perform operations comprising: receiving a first Application Programming Interface (API) request from one or more source devices through a first endpoint, wherein the first API request indicates requirement of the one or more source devices to perform one or more data transactions with a corresponding candidate application server; parsing the first API request of each of the one or more source devices to identify the requirement of the one or more source devices; generating a unique first response for each of the one or more source devices based on the requirement corresponding to the one or more source devices, wherein the unique first response generated for each of the one or more source devices comprises a unique second endpoint that facilitates the one or more data transactions with the corresponding candidate application server; and transmitting the unique first response generated for each of the corresponding one or more source devices, wherein each of the one or more source devices use the corresponding unique second endpoint to perform the one or more data transactions with the corresponding candidate application server.

In some non-limiting embodiments or aspects, the instructions cause the corresponding candidate application server associated with the polling service system to: receive a second API request from the one or more source devices through the corresponding unique second endpoint, wherein the second API request comprises parameters and metadata required for performing the one or more data transactions with the corresponding candidate application server; validate: if the one or more source devices are trusted sources, and if the second API request received through the corresponding unique second endpoint is a valid request; and transmit, upon successful validation, a second response to the one or more source devices through the corresponding unique second endpoint, wherein the second response is generated upon performing the one or more data transactions comprising at least one of the following: data retrieval, modification of data elements, addition of data elements, deletion of data elements, replacement of data elements, or any combination thereof.

Further non-limiting embodiments or aspects are set forth in the following numbered clauses.

Clause 1: A computer-implemented method comprising: receiving, by a polling service system, a first Application Programming Interface (API) request from one or more source devices through a first endpoint, wherein the first API request indicates requirement of the one or more source devices to perform one or more data transactions with a corresponding candidate application server; parsing, by the polling service system, the first API request of each of the one or more source devices to identify the requirement of the one or more source devices; generating, by the polling service system, a unique first response for each of the one or more source devices based on the requirement corresponding to the one or more source devices, wherein the unique first response generated for each of the one or more source devices comprises a unique second endpoint that facilitates the one or more data transactions with the corresponding candidate application server; and transmitting, by the polling service system, the unique first response generated for each of the corresponding one or more source devices, wherein each of the one or more source devices use the corresponding unique second endpoint to perform the one or more data transactions with the corresponding candidate application server.

Clause 2: The computer-implemented method of clause 1, wherein the one or more source devices are validated prior to generation of the unique first response.

Clause 3: The computer-implemented method of clause 1 or 2, wherein the unique first response further comprises at least one of the following: parameters required for performing the one or more data transactions with the corresponding candidate application server and a unique transaction token for validation purposes, an encryption key, one or more input fields for an API call, or any combination thereof.

Clause 4: The computer-implemented method of any or clauses 1-3, further comprising storing, by the polling service system, intimation information corresponding to each of the generated unique first responses, wherein the intimation information comprises a unique transaction token provided to the one or more source devices for validation purposes, and at least one of the following: an identifier of the one or more source devices, details of the unique second endpoint to be provided to the one or more source devices, an identifier of the corresponding candidate application server that the one or more source devices are allowed to access through the unique second endpoint, or any combination thereof.

Clause 5: The computer-implemented method of any of clauses 1-4, wherein the unique second endpoint is dynamically generated in response to each of the first API requests based on one or more predefined rules, wherein the one or more predefined rules are related to at least one of the following: a version of a corresponding candidate application facilitating the corresponding candidate application server, criticality of the requirement of the one or more source devices, geographic location of the one or more source devices, validity time of the unique second endpoint, or any combination thereof.

Clause 6: The computer-implemented method of any of clauses 1-5, wherein the first API request comprises at least one of the following: a device Identifier (ID) of the one or more source devices, an Internet Protocol (IP) address associated with the one or more source devices, latitude and longitude associated with the IP address, a device score, a device type, an initial base token, a product ID, action code, user ID, pre-address ID, metadata required to complete the one or more data transactions, or any combination thereof.

Clause 7: The computer-implemented method of clauses 1-6, further comprising: receiving, by the corresponding candidate application server, a second API request from the one or more source devices through the corresponding unique second endpoint, wherein the second API request comprises parameters and metadata required for performing the one or more data transactions with the corresponding candidate application server; validating, by the corresponding candidate application server, if the one or more source devices are trusted sources, and if the second API request received through the corresponding unique second endpoint is a valid request; and transmitting, by the corresponding candidate application server, upon successful validation, a second response to the one or more source devices, through the corresponding unique second endpoint, wherein the second response is generated upon performing the one or more data transactions comprising at least one of the following: data retrieval, modification of data elements, addition of data elements, deletion of data elements, replacement of data elements, or any combination thereof, and wherein the second response comprises at least one of acknowledgement related to the one or more data transactions and data related to the one or more data transactions.

Clause 8: The computer-implemented method of any of clauses 1-7, wherein the validating comprises: retrieving, by the corresponding candidate application server, intimation information related to the corresponding candidate application server from a polling database associated with the polling service system; and comparing, by the corresponding candidate application server, the intimation information with a corresponding unique transaction token present in the second API request of the one or more source devices to determine a match.

Clause 9: The computer-implemented method of any of clauses 1-8, further comprising performing one of accepting or rejecting, by the corresponding candidate application server, the second API request, if the comparison determines the match or a mismatch, respectively.

Clause 10: A polling service system comprising: a processor; and a memory communicatively coupled to the processor, wherein the memory stores processor instructions, which, on execution, causes the processor to: receive a first Application Programming Interface (API) request from one or more source devices through a first endpoint, wherein the first API request indicates requirement of the one or more source devices to perform one or more data transactions with a corresponding candidate application server; parse the first API request of each of the one or more source devices to identify the requirement of the one or more source devices; generate a unique first response for each of the one or more source devices based on the requirement corresponding to the one or more source devices, wherein the unique first response generated for each of the one or more source devices comprises a unique second endpoint that facilitates the one or more data transactions with the corresponding candidate application server; and transmit the unique first response generated for each of the corresponding one or more source devices, wherein each of the one or more source devices use the corresponding unique second endpoint to perform the one or more data transactions with the corresponding candidate application server.

Clause 11: The polling service system of clause 10, wherein the one or more source devices are validated prior to generation of the unique first response.

Clause 12: The polling service system of clause 10 or 11, wherein the unique first response further comprises at least one of the following: parameters required for performing the one or more data transactions with the corresponding candidate application server and a unique transaction token for validation purposes, an encryption key, one or more input fields for an API call, or any combination thereof.

Clause 13: The polling service system of any of clauses 10-12, wherein the processor is further configured to store intimation information corresponding to each of the generated unique first responses, wherein the intimation information comprises a unique transaction token provided to the one or more source devices for validation purposes, and at least one of the following: an identifier of the one or more source devices, details of the unique second endpoint to be provided to the one or more source devices, an identifier of the corresponding candidate application server that the one or more source devices are allowed to access through the unique second endpoint, or any combination thereof.

Clause 14: The polling service system of any of clauses 10-13, wherein the processor generates the unique second endpoint dynamically in response to each of the first API requests based on one or more predefined rules, wherein the one or more predefined rules are related to at least one of the following: a version of a corresponding candidate application facilitating the corresponding candidate application server, criticality of the requirement of the one or more source devices, geographic location of the one or more source devices, validity time of the unique second endpoint, or any combination thereof.

Clause 15: The polling service system of any of clauses 10-14, wherein the first API request comprises at least one of the following: a device Identifier (ID) of the one or more source devices, an Internet Protocol (IP) address associated with the one or more source devices, latitude and longitude associated with the IP address, a device score, a device type, an initial base token, a product ID, action code, user ID, pre-address ID, metadata required to complete the one or more data transactions, or any combination thereof.

Clause 16: The polling service system of any of clauses 10-15, wherein the corresponding candidate application server associated with the polling service system is configured to: receive a second API request from the one or more source devices through the corresponding unique second endpoint, wherein the second API request comprises parameters and metadata required for performing the one or more data transactions with the corresponding candidate application server; validate: if the one or more source devices are trusted sources, and if the second API request received through the corresponding unique second endpoint is a valid request; and transmit, upon successful validation, a second response to the one or more source devices, through the corresponding unique second endpoint, wherein the second response is generated upon performing the one or more data transactions comprising at least one of the following: data retrieval, modification of data elements, addition of data elements, deletion of data elements, replacement of data elements, or any combination thereof, and wherein the second response comprises at least one of acknowledgement related to the one or more data transactions and data related to the one or more data transactions.

Clause 17: The polling service system of any of clauses 10-16, wherein, to validate, the corresponding candidate application server is configured to: retrieve intimation information related to the corresponding candidate application server from a polling database associated with the polling service system; and compare the intimation information with a corresponding unique transaction token present in the second API request of the one or more source devices to determine a match.

Clause 18: The polling service system of any of clauses 10-17, wherein the corresponding candidate application server performs one of accepting or rejecting the second API request if the comparison determines the match or a mismatch, respectively.

Clause 19: A non-transitory computer-readable medium including instructions stored thereon that when processed by at least one processor, causes a polling service system to perform operations comprising: receiving a first Application Programming Interface (API) request from one or more source devices through a first endpoint, wherein the first API request indicates requirement of the one or more source devices to perform one or more data transactions with a corresponding candidate application server; parsing the first API request of each of the one or more source devices to identify the requirement of the one or more source devices; generating a unique first response for each of the one or more source devices based on the requirement corresponding to the one or more source devices, wherein the unique first response generated for each of the one or more source devices comprises a unique second endpoint that facilitates the one or more data transactions with the corresponding candidate application server; and transmitting the unique first response generated for each of the corresponding one or more source devices, wherein each of the one or more source devices use the corresponding unique second endpoint to perform the one or more data transactions with the corresponding candidate application server.

Clause 20: The medium of clause 19, wherein the instructions cause the corresponding candidate application server associated with the polling service system to: receive a second API request from the one or more source devices through the corresponding unique second endpoint, wherein the second API request comprises parameters and metadata required for performing the one or more data transactions with the corresponding candidate application server; validate: if the one or more source devices are trusted sources, and if the second API request received through the corresponding unique second endpoint is a valid request; and transmit, upon successful validation, a second response to the one or more source devices through the corresponding unique second endpoint, wherein the second response is generated upon performing the one or more data transactions comprising at least one of the following: data retrieval, modification of data elements, addition of data elements, deletion of data elements, replacement of data elements, or any combination thereof.

Disclosed herein is a computer-implemented method that may include receiving, by a polling service system, a first Application Programming Interface (API) request from one or more source devices through a first endpoint. The first API request indicates requirement of the one or more source devices to perform one or more data transactions with a corresponding candidate application server. Further, the method includes parsing, by the polling service system, the first API request of each of the one or more source devices to identify the requirement of the one or more source devices. Thereafter, the method includes generating a unique first response for each of the one or more source devices based on the requirement corresponding to the one or more source devices. The unique first response generated for each of the one or more source devices comprises a unique second endpoint that facilitates the one or more data transactions with the corresponding candidate application server. Finally, the method includes transmitting the unique first response generated for each of the corresponding one or more source devices. Each of the one or more source devices uses the corresponding unique second endpoint to perform the one or more data transactions with the corresponding candidate application server.

Further, in some non-limiting embodiments or aspects, the present disclosure may include a polling service system. The polling service system includes a processor and a memory communicatively coupled to the processor. The memory stores the processor instructions, which, on execution, causes the processor to receive a first Application Programming Interface (API) request from one or more source devices through a first endpoint. The first API request indicates requirement of the one or more source devices to perform one or more data transactions with a corresponding candidate application server. Further, the processor parses the first API request of each of the one or more source devices to identify the requirement of the one or more source devices. Thereafter, the processor generates a unique first response for each of the one or more source devices based on the requirement corresponding to the one or more source devices. The unique first response generated for each of the one or more source devices comprises a unique second endpoint that facilitates the one or more data transactions with the corresponding candidate application server. Finally, the processor transmits the unique first response generated for each of the corresponding one or more source devices. Each of the one or more source devices uses the corresponding unique second endpoint to perform the one or more data transactions with the corresponding candidate application server.

Further, in some non-limiting embodiments or aspects, the present disclosure may include a non-transitory computer-readable medium including instructions stored thereon that when processed by at least one processor causes a polling service system to perform operations comprising receiving a first Application Programming Interface (API) request from one or more source devices through a first endpoint. The first API request indicates requirement of the one or more source devices to perform one or more data transactions with a corresponding candidate application server. Further, the instructions cause the processor to parse the first API request of each of the one or more source devices to identify the requirement of the one or more source devices. Thereafter, the instructions cause the processor to generate a unique first response for each of the one or more source devices based on the requirement corresponding to the one or more source devices. The unique first response generated for each of the one or more source devices comprises a unique second endpoint that facilitates the one or more data transactions with the corresponding candidate application server. Finally, the instructions cause the processor to transmit the unique first response generated for each of the corresponding one or more source devices. Each of the one or more source devices use the corresponding unique second endpoint to perform the one or more data transactions with the corresponding candidate application server.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 2B is an exemplary first API request in accordance with some non-limiting embodiments or aspects of the present disclosure;

FIG. 2C is an exemplary unique first response in accordance with some non-limiting embodiments or aspects of the present disclosure;

FIG. 2D is an exemplary second API request in accordance with some non-limiting embodiments or aspects of the present disclosure;

FIG. 2E is an exemplary encrypted second API request in accordance with some non-limiting embodiments or aspects of the present disclosure;

FIGS. 2G and 2H are exemplary first API requests in accordance with some non-limiting embodiments or aspects of the present disclosure;

FIGS. 2I and 2J are exemplary unique first responses in accordance with some non-limiting embodiments or aspects of the present disclosure;

FIGS. 2K and 2L are exemplary second API requests in accordance with some non-limiting embodiments or aspects of the present disclosure;

FIGS. 2M and 2N are exemplary encrypted second API requests in accordance with some non-limiting embodiments or aspects of the present disclosure;

Figure 1:
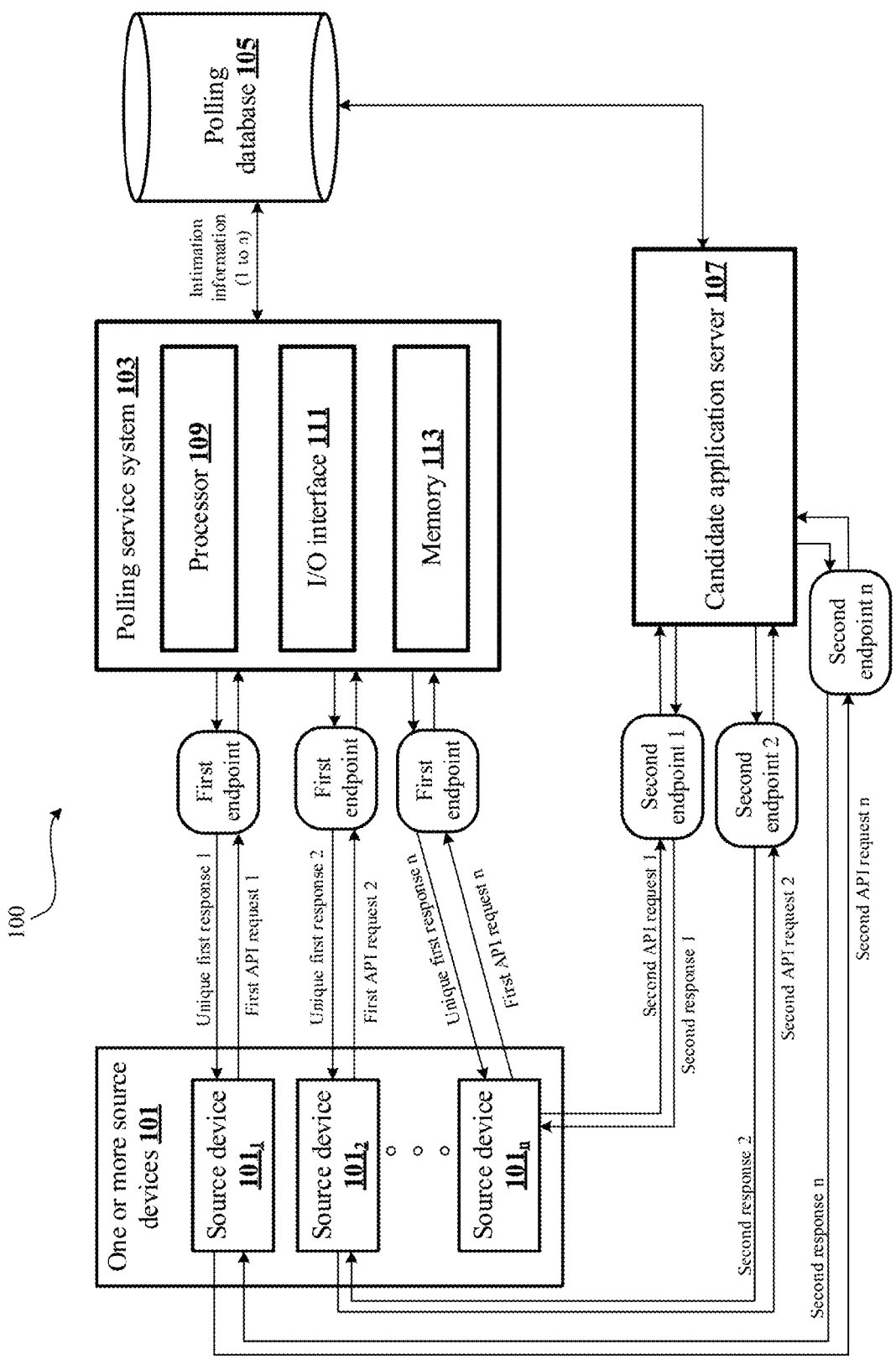
FIG. 1 is an exemplary architecture for performing data transactions using dynamic endpoints in accordance with some non-limiting embodiments or aspects of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer-readable medium and executed by a computer or processor, whether or not such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the term "exemplary" is used herein to mean "serving as an example, instance, or illustration." Any embodiment, aspect, or implementation of the present subject matter described herein as "exemplary" is not necessarily to be construed as preferred or advantageous over other embodiments.

In the following detailed description of non-limiting embodiments or aspects of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof are intended to cover a non-exclusive inclusion such that a setup, device, or method that comprises a list of components or steps does not include only those components or steps but may include other components or steps not expressly listed or inherent to such setup, device, or method. In other words, one or more elements in a system or apparatus proceeded by "comprises . . . a" do not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" do not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/feature. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices or computing units, such as processors, storage devices, and/or similar computer components, that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The present disclosure relates to a computer-implemented method, a polling service system, and a non-transitory computer-readable medium for performing data transactions using dynamic endpoints. In some non-limiting embodiments or aspects, an Application Programming Interface (API) framework discussed in the present disclosure may include, but is not limited to, Representational State Transfer (REST) frameworks. The method disclosed in the present disclosure has two phases: a polling phase and a transaction phase. The polling phase is a phase where a polling service system receives a first API request from the one or more source devices and provides a dynamic endpoint for the one or more source devices to interact with the corresponding candidate application server of their requirement. The transaction phase is the phase where the corresponding candidate application server receives a second API request from the one or more source devices for performing the data transactions, through the dynamic endpoint generated during the polling phase. The polling phase introduced in the present disclosure provides a dynamic approach of addressing the corresponding candidate application servers, which reduces third party attacks, thereby enhancing data security, and also enables testing new versions of legacy codes in increments.

The present disclosure eliminates dependency of using a single endpoint by every consumer in the external environment, which is prone to attacks. The polling phase provides a dynamic endpoint for the one or more source devices to communicate with the corresponding candidate application server. Generally, there is no separate polling phase which provides a dynamic endpoint to interact with the corresponding candidate application server. Rather, any source device could interact with the corresponding candidate application server using a static endpoint. Since such static endpoint is extensively used to interact with a particular candidate application server, and is well known to users around the world, such static endpoints are exposed to threats of interception of outgoing requests in the one or more source devices, thereby compromising on data security. In the present disclosure, since the polling phase is introduced to provide a dynamic endpoint, the same candidate application server is represented with different dynamic endpoints for different requests. Therefore, it would not be possible for the attackers to understand the destination of the dynamic endpoint. In other words, attackers would not be able to understand which candidate application server is being addressed using the dynamic endpoint. Also, such dynamic endpoint may also be associated with a timeout period which means the dynamic endpoint is valid only for a certain time period, within which the one or more source devices need to interact with the corresponding candidate application server for performing the data transactions. The timeout period may also be set dynamically and may be different for different requests. Moreover, the dynamic endpoint is validated in real-time by the corresponding candidate application server based on the intimation information provided by the polling service system to the corresponding candidate application server. Therefore, the corresponding candidate application server is well aware of the type of device which would be communicating through which endpoint, even before receiving the request from the one or more source devices. Therefore, such dynamic endpoint which is time bound and validated in real-time is very difficult to be hacked or predicted, thereby reducing the interception of outgoing requests in the source device, and in turn enhancing the data security.

Further, in the present disclosure, the dynamic endpoint is used for diverting the one or more source devices to interact with new versions of a corresponding candidate application. The present disclosure achieves the same by using predefined rules. For instance, all the API requests coming from a certain geographic location may be addressed to version 2 of the corresponding candidate application, and rest of the API requests may be addressed to a legacy code of the corresponding candidate application. Therefore, such dynamic endpoint combined with predefined rules ensures that some amount of API requests can be addressed to newer versions of the corresponding candidate application, hence allowing the developers to test the newer versions of the corresponding candidate application with few users in real-time without impacting or disturbing the overall working of the legacy code. Therefore, the present disclosure provides a mechanism to ensure testing of different versions developed for a legacy code, which in turn can help in updating legacy codes by appending the new versions to the existing legacy code, or replace the legacy code with the new version and the like. This in turn enables the users to use new features, security updates, and the like over the existing legacy codes. Therefore, the present disclosure enables real-time testing of the different versions of the legacy code on an incremental basis based on predefined rules.

Further, the present disclosure provides the flexibility of adding any number of new endpoints dynamically, wherein each new endpoint can be addressed to different versions and introduce different principles. Different versions and principles may require different inputs or a different number of inputs. Therefore, the present disclosure provides the flexibility of adding or deleting input fields in the polling phase, based on which the one or more source devices insert the input data while sending a request to the corresponding candidate application server via the dynamic endpoint.

Furthermore, the present disclosure provides the flexibility to target users of different geographic locations or different device types or different action codes with different versions of the legacy code.

FIG. 1 shows an exemplary architecture for performing data transactions using dynamic endpoints in accordance with some non-limiting embodiments or aspects of the present disclosure.

In some non-limiting implementations, a system 100 may include one or more source devices $101_1$ to $101_n$ (collectively referred to as one or more source devices 101), a polling service system 103, a polling database 105, and a corresponding candidate application server 107. In some non-limiting embodiments or aspects, the one or more source devices 101 may be devices requesting a dynamic endpoint for communicating with the corresponding candidate application server 107 for performing one or more data transactions. The one or more source devices 101 may be associated with users involved in performing the one or more data transactions. As an example, the one or more source devices 101 may include, but are not limited to, a mobile device, a laptop, a desktop, a tablet phone, and/or the like. In some non-limiting embodiments or aspects, the one or more source devices 101 may be associated with the polling service system 103 via a communication network (not shown in FIG. 1). As an example, the communication network is a wireless communication network.

In some non-limiting embodiments or aspects, the one or more source devices 101 may communicate with the polling service system 103 using a first endpoint as shown in FIG. 1. As an example, the first endpoint is a static endpoint which may act as an address representing the polling service system 103. The polling service system 103 may be associated with the polling database 105 via a wired or wireless communication network. In some non-limiting embodiments or aspects, the polling database 105 may store intimation information related to API requests received from the one or more source devices 101. In some non-limiting embodiments or aspects, the intimation information is the information stored in the polling database 105 to intimate the corresponding candidate application server 107 regarding communications, or in other words, API requests, directed to the corresponding candidate application server 107 via unique second endpoints (dynamic endpoints). In some non-limiting embodiments or aspects, the corresponding candidate application server 107 may also be associated with the polling database 105 as shown in FIG. 1. The corresponding candidate application server 107 may be associated with the polling database 105 via the wireless communication network to access the information related to the API requests. FIG. 1 is illustrated using a single candidate application server 107. However, this should not be construed as a limitation of the present disclosure, as the method disclosed in the present disclosure is applicable for more than one candidate application server 107 as well.

In some non-limiting embodiments or aspects, the polling service system 103 may include a processor 109, an Input/Output (I/O) interface 111, and a memory 113. In some non-limiting embodiments or aspects, the method of the present disclosure may include two phases: a polling phase and a transaction phase. In some non-limiting embodiments or aspects, during the polling phase, the I/O interface 111 may receive a first API request (first API requests 1 to n as shown in FIG. 1) from the one or more source devices 101. In some non-limiting embodiments or aspects, the first API request may be a request sent to the polling service system 103 for a dynamic endpoint for communicating with the corresponding candidate application server 107 for performing one or more data transactions. In some non-limiting embodiments or aspects, the first API request may include all the information which is required to identify the user sending the first API request. In some non-limiting embodiments or aspects, the first API request may include, but is not limited to, at least one of a device Identifier (ID) of the one or more source devices 101, an Internet Protocol (IP) address associated with the one or more source devices 101, latitude and longitude associated with the IP address, device score, device type, product ID, action code, user ID, pre-address ID, and metadata required to complete the one or more data transactions.

Upon receiving the first API request, the processor 109 may validate the one or more source devices 101 to verify whether the first API request is received from legitimate source devices. In some non-limiting embodiments or aspects, such validation may be performed prior to generation of a unique first response for the first API request. If the one or more source devices 101 are successfully validated, the processor 109 may parse the first API request of each of the one or more source devices 101 to identify the requirement of the one or more source devices 101. In some non-limiting embodiments or aspects, based on the requirement of the corresponding one or more source devices 101, the processor 109 may generate the unique first response (unique first responses 1 to n as shown in FIG. 1) for each of the corresponding one or more source devices 101. In some non-limiting embodiments or aspects, the unique first response generated for each of the one or more source devices 101 may include a unique second endpoint (unique second endpoints 1 to n as shown in the FIG. 1) that facilitates the one or more source devices 101 to perform the one or more data transactions with the corresponding candidate application server 107. In some non-limiting embodiments or aspects, the unique second endpoint is a dynamically generated endpoint for allowing the one or more source devices 101 to perform one or more data transactions with the corresponding candidate application server 107. In some non-limiting embodiments or aspects, the unique first response may further include, but is not limited to, at least one of the parameters required for performing the one or more data transactions with the corresponding candidate application server 107, a unique transaction token for validation purposes, an encryption key, and one or more input fields for an API call.

Thereafter, the processor 109 may store the intimation information corresponding to each of the generated unique responses in the polling database 105. In some non-limiting embodiments or aspects, the intimation information may include, but is not limited to, a unique transaction token provided to the one or more source devices 101 for validation purposes, and at least one of an identifier of the one or more source devices 101, details of the unique second endpoint provided to the one or more source devices 101, and an identifier of the corresponding candidate application server that the one or more source devices are allowed to access through the unique second endpoint. In some non-limiting embodiments or aspects, the processor 109 may then transmit the unique first response generated for each of the corresponding one or more source devices 101. In some non-limiting embodiments or aspects, each of the one or more source devices 101 may use the corresponding unique second endpoint to perform the one or more data transactions with the corresponding candidate application server 107. In some non-limiting embodiments or aspects, the corresponding candidate application server 107 may receive a second API request (second API requests 1 to n as shown in FIG. 1) from the one or more source devices 101 through the corresponding unique second endpoint. The second API request may include, but is not limited to, parameters and metadata required for performing the one or more data transactions with the corresponding candidate application server 107. As an example, the parameters may be input fields such as address, city, state, country, and the like, and the metadata may be payloaded to be transmitted and/or the inputs inserted by the user in the input fields. In some non-limiting embodiments or aspects, the one or more source devices 101 may encrypt the parameters and metadata enclosed within the second API request before transmitting the second API request to the corresponding candidate application server 107 for performing the one or more data transactions. Upon receiving the second API request, the corresponding candidate application server 107 may validate the one or more source devices 101 and also the second API request received through the unique second endpoint, and thereafter may allow the one or more source devices 101 to perform the one or more data transactions. Upon completion of the one or more data transactions, the corresponding candidate application server 107 may transmit a second response (second responses 1 to n as shown in FIG. 1) to the one or more source devices 101. As an example, the second response may be related to the one or more data transactions that may include, but are not limited to, data retrieval, modification of data elements, addition of data elements, deletion of data elements, and replacement of data elements. As an example, if the data transaction is a data retrieval action, the corresponding candidate application server 107 may provide a second response comprising data requested by the one or more source devices 101. As an example, if the data transaction is related to the addition of data elements, the corresponding candidate application server 107 may add/append the data elements to existing data associated with the corresponding candidate application server 107 and may provide an acknowledgement of such an addition as the second response to one or more data transactions.

Figure 2A:
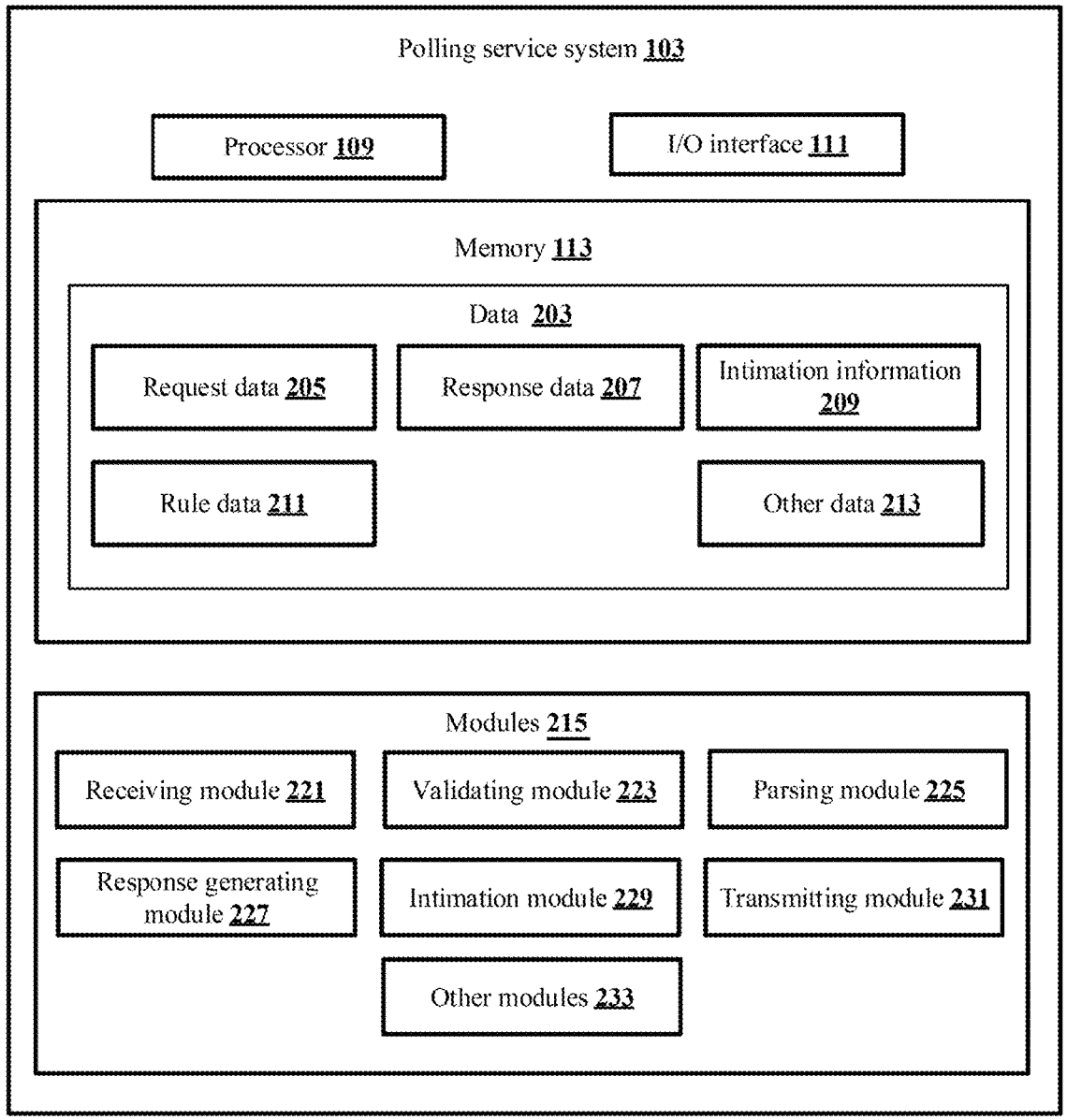
FIG. 2A is a detailed block diagram of a polling service system for providing dynamic endpoints for performing data transactions, in accordance with some non-limiting embodiments or aspects of the present disclosure.

FIG. 2A shows a detailed block diagram of a polling service system for providing dynamic endpoints for performing data transactions, in accordance with some non-limiting embodiments or aspects of the present disclosure.

In some non-limiting implementations, the polling service system 103 may include data 203 and modules 205 as shown in FIG. 2A. As an example, the data 203 may be stored in the memory 113 as shown in FIG. 2A. In some non-limiting embodiments or aspects, the data 203 may include request data 205, response data 207, intimation information 209, rule data 211 and other data 213. As illustrated FIG. 2A, modules 215 are described herein in detail.

In some non-limiting embodiments or aspects, the data 201 may be stored in the memory 113 in the form of various data structures. Additionally, the data 201 can be organized using data models, such as relational or hierarchical data models. The other data 213 may store data, including temporary data and temporary files, generated by the modules 215 for performing the various functions of the polling service system 103.

In some non-limiting embodiments or aspects, the data 201 stored in the memory 113 may be processed by the modules 215 of the polling service system 103. The modules 215 may be stored within the memory 113. In an example, the modules 215, communicatively coupled to the processor 109 configured in the polling service system 103, may also be present outside the memory 113 as shown in FIG. 2A and implemented as hardware. As used herein, the term modules 215 may refer to an Application Specific Integrated Circuit (ASIC), an electronic circuit, a processor (shared, dedicated, or group), and memory that execute one or more software or firmware programs, a combinational logic circuit, and/or other suitable components that provide the described functionality.

In some non-limiting embodiments or aspects, the modules 215 may include, for example, a receiving module 221, a validating module 223, a parsing module 225, a response generating module 227, intimation module 229, a transmitting module 231, and other modules 233. The other modules 233 may be used to perform various miscellaneous functionalities of the polling service system 103. It will be appreciated that such aforementioned modules 203 may be represented as a single module or a combination of different modules.

In some non-limiting embodiments or aspects, the receiving module 221 may receive a first API request from one or more source devices 101 through a first endpoint. The first API request thus received by the polling service system 103 may be stored as the request data 205. In some non-limiting embodiments or aspects, the one or more source devices 101 may be devices requesting a dynamic endpoint for communicating with the corresponding candidate application server 107 for performing one or more data transactions. The one or more source devices 101 may be associated with users involved in performing the one or more data transactions. As an example, the one or more source devices 101 may include, but are not limited to, a mobile device, a laptop, a desktop, a tablet phone, and the like. In some non-limiting embodiments or aspects, the first endpoint may be a static endpoint which may act as an address representing the polling service system 103. As an example, the first endpoint may be a Uniform Resource Locator (URL). In some non-limiting embodiments or aspects, the first API request may indicate requirement of the one or more source devices 101 to perform one or more data transactions with a corresponding candidate application server 107. In some non-limiting embodiments or aspects, the first API request may include, but is not limited to, at least one of a device ID of the one or more source devices 101, an IP address associated with the one or more source devices 101, latitude and longitude associated with the IP address, device score, device type, an initial base token, product ID, action code, user ID, pre-address ID, and metadata required to complete the one or more data transactions. An exemplary first API request is as shown in FIG. 2B.

In some non-limiting embodiments or aspects, parameters included in the first API request may range from Decision and Fraud Management (DFM) parameters to any API specific pre-transaction parameters that assist an API call. In some non-limiting embodiments or aspects, including such parameters in the first API request may help in identifying the corresponding candidate application server 107 to detect accurate cells or data elements in database tables as per requirement of the one or more source devices 101. In the exemplary first API request as shown in FIG. 2B, the device ID, the IP address associated with the source device, latitude and longitude associated with the IP address, device type, and device score may be the DFM parameters. In some non-limiting embodiments or aspects, device score may help in determining the trust factor of the one or more source devices 101, which means that, when there are requests above a predefined limit from the same source device, the device score may reduce. If the device score is below a predefined device score value, that source device may be blacklisted. Further, the parameters such as the first transaction token, the product ID, the action code, the user ID, and the pre-address ID of the above exemplary first API request may be the API specific pre-transaction parameters. In some non-limiting embodiments or aspects, the action code may indicate an action to be performed during a transaction phase, and in case the action code represents an action which involves a change of address, then the pre-address ID may represent the ID of the address that is to be modified in the transaction phase. In some non-limiting embodiments or aspects, the parameters as shown in the above exemplary first API request do not include actual payload, but include necessary attributes required to process one or more data transactions with the corresponding candidate application server 107.

In some non-limiting embodiments or aspects, the validating module 223 may validate the one or more source devices 101 to verify whether the first API request is received from legitimate source devices 101. In some non-limiting embodiments or aspects, such validation may be performed prior to generation of a unique first response for the first API request. In some non-limiting embodiments or aspects, as part of the validation, the validating module 223 may check the login status of users, check if the users have permission to access or perform the requested action, check whether the one or more source devices of the users support functionality requested by the user, and the like. In some non-limiting embodiments or aspects, the validating module 223 may perform such validation based on information provided as part of the first API request. As an example, by correlating the device ID, device score, geographic location, and/or product ID, the validating module 223 may understand if the user has a permission to access such product. Similarly, for example, the validating module 223 may validate if the one or more source devices 101 support functionality requested by the users by correlating the device ID, device type, and action code. In some non-limiting embodiments or aspects, if the validation is not successful for any of the aforementioned scenarios, the validating module 223 may indicate unsuccessful validation. The polling service system 103 may thereafter reject the first API request with an appropriate Hypertext Transfer Protocol (HTTP) response. As an example, the HTTP response may be HTTP 400—BAD_REQUEST.

In some non-limiting embodiments or aspects, upon successful validation, the parsing module 225 may parse the first API request of each of the one or more source devices 101 to identify the requirement of the one or more source devices 101. As an example, the parsing module 225 may parse the action code, pre-address ID, product ID, and the like to understand the requirement of the one or more source devices 101. In other words, the parsing module 225 may parse the information provided in the first API request to understand the type of data transactions that the one or more source devices 101 are seeking to perform with the corresponding candidate application server 107.

In some non-limiting embodiments or aspects, upon parsing the first API request, the response generating module 227 may generate a unique first response for each of the one or more source devices 101 based on the requirement of the corresponding one or more source devices 101. The unique first response thus generated by the response generating module 227 may be stored as the response data 207. In some non-limiting embodiments or aspects, the unique first response generated for each of the one or more source devices 101 may include a unique second endpoint that facilitates the one or more data transactions with the corresponding candidate application server 107. In some non-limiting embodiments or aspects, the unique first response may further include, but is not limited to, at least one of the parameters required for performing the one or more data transactions with the corresponding candidate application server 107, a unique transaction token for validation purpose, an encryption key, and one or more input fields for an API call. An exemplary unique first response is as shown in FIG. 2C.

In the exemplary unique first response shown in FIG. 2C, the second endpoint is the dynamically generated endpoint, for example, a URL to which the one or more source devices 101 may send a second API request comprising payload. In some non-limiting embodiments or aspects, the value of the token in the unique first response is different from the initial base token, and the response generating module 227 may replace the initial base token included in the first API request with the unique transaction token as shown in the exemplary unique first response shown in FIG. 2C. In some non-limiting embodiments or aspects, the unique transaction token may represent the login status of the user. Further, the input fields in the above exemplary unique first response may be provided for the user to provide input. In some non-limiting embodiments or aspects, such input provided by the user in the input fields may be included in the second API request to communicate with the corresponding candidate application server 107. In some non-limiting embodiments or aspects, the encryption key included as part of the unique first response may be used for encrypting data by the one or more source devices 101 before transmitting such data to the corresponding candidate application server 107. In some non-limiting embodiments or aspects, to generate the unique first response that includes a unique second point, the response generating module 227 may firstly identify if the one or more source devices 101 have the capability to support the data transaction that the user of the one or more source devices 101 wishes to perform with the corresponding candidate application server 107. In some non-limiting embodiments or aspects, the response generating module 227 may identify if the one or more source devices 101 have the capability to support the data transaction by correlating an action code, a preaddress ID, device parameters such as device ID, device type, device score and the like included in the first API request. Secondly, the response generating module 227 may identify the corresponding candidate application server 107 that each of the one or more source devices 101 have requested to perform the data transaction based on the parsed data.

Upon parsing the first API request, the response generating module 227 may identify product specific information such as product ID included as part of the first API request. Based on such product ID, the response generating module 227 may identify the corresponding candidate application server 107 with which the one or more source devices 101 are requesting to perform the data transaction with. In some non-limiting embodiments or aspects, only when the one or more source devices 101 have the capability to support the data transaction to be performed, and when the corresponding candidate application server 107 with which the one or more source devices 101 want to perform the data transaction is identified, the response generating module 227 may generate the unique second endpoint to be included in the unique first response. In some non-limiting embodiments or aspects, the unique second endpoint may be dynamically generated in response to each of the first API requests based on one or more predefined rules.

The one or more predefined rules may be related to at least one of a version of a corresponding candidate application facilitating the corresponding candidate application server 107, criticality of the requirement of the one or more source devices 101, geographic location of the one or more source devices 101, and validity time of the unique second endpoint. As an example, consider there are three versions of the candidate application facilitating the corresponding candidate application server 107. Among the three versions, consider one version is a legacy code, whereas other two versions are newly developed versions, which need to be iteratively tested in real-time, for updating the legacy code. Therefore, for iteratively testing the two versions of the candidate application, predefined rules may be stored in the polling service system 103. As an example, consider the predefined rules may be as shown below:

If geographic location of the first API request is "XXX", assign the unique second endpoint to represent version 2 of the corresponding candidate application;
If geographic location of the first API request is "YYY", assign the unique second endpoint to represent version 3 of the corresponding candidate application;
If geographic location of the first API request is any other location apart from XXX and YYY, assign the unique second endpoint to represent version 1 of the corresponding candidate application.

Assigning the unique second endpoint for each first API request based on the above-mentioned exemplary predefined rules, may ensure that only the users whose first API requests are from geographic locations of XXX and YYY get the unique second endpoint representing the newly developed versions of the corresponding candidate application. Therefore, this mechanism allows testing different versions which could be integrated in the legacy code or replaced in the legacy code to explore newer features and enhancements. Multiple predefined rules may be stored in the polling service system 103 with respect to parameters other than geographic location such as device type, criticality of the first API requests, and the like. In some non-limiting embodiments or aspects, the predefined rules may be stored as the rule data 211.

In some non-limiting embodiments or aspects, upon generating the unique first response, the intimation module 229 may store intimation information 209 corresponding to each generated unique first response in a polling database 105 associated with the polling service system 103. In some non-limiting embodiments or aspects, the intimation information 209 may include, but is not limited to, the unique transaction token provided to the one or more source devices 101 for validation purpose and at least one of an identifier of the one or more source devices 101, details of the unique second endpoint to be provided to the one or more source devices 101, and an identifier of the corresponding candidate application server 107 that the one or more source devices 101 are allowed to access through the unique second endpoint. In some non-limiting embodiments or aspects, the intimation information 209 may have additional information such as the action code, the preaddress ID, a timeout parameter, and the like. The timeout parameter may be a parameter that indicates the time period up to which the unique second endpoint is valid. In some non-limiting embodiments or aspects, the intimation module 229 may intimate the corresponding candidate application server 107 regarding generation of the unique second endpoint for the one or more source devices 101 to access the corresponding candidate application server 107. In some non-limiting embodiments or aspects, the corresponding candidate application server 107 may access the polling database 105 to read the intimation information 209 and provide an acknowledgement to the polling service system 103. In some non-limiting embodiments or aspects, upon reading the intimation information 209, the corresponding candidate application server 107 may be prepared to receive a request from the corresponding one or more source devices 101 as indicated in the intimation information 209. The corresponding candidate application server 107 may wait for the time period as indicated by the timeout parameter to receive a request from the one or more corresponding source devices 101.

Further, in some non-limiting embodiments or aspects, the transmitting module 231 may transmit the unique first response generated for each of the corresponding source devices 101 to the respective one or more source devices 101. In some non-limiting embodiments or aspects, each of the one or more source devices 101 may use the corresponding unique second endpoint to perform the one or more data transactions with the corresponding candidate application server 107. In some non-limiting embodiments or aspects, upon receiving the unique first response from the transmitting module 231, the one or more source devices 101 may prepare a dynamic payload using the information present in the unique first response. In some non-limiting embodiments or aspects, the dynamic payload may include parameters and metadata required for performing the one or more data transactions with the corresponding candidate application server 107. As an example, the parameters may be various input fields provided by the transmitting module 231 in the unique first response for which the user may fill in values. As an example, the metadata may be values filled in by the user for each of the input fields or any other data which assists in performing the one or more data transactions. As an example, the metadata may include details related to the one or more data transactions to be performed with the corresponding candidate application server 107. An exemplary dynamic payload may be as shown in FIG. 2D.

In some non-limiting embodiments or aspects, the one or more source devices 101 may encrypt the dynamic payload with the encryption key provided in the unique first response. As an example, the dynamic payload after encryption may be as shown in FIG. 2E.

In some non-limiting embodiments or aspects, the one or more source devices 101 may each transmit a second API request to the corresponding unique second endpoint received from the transmitting module 231. The second API request may include the dynamic payload which may or may not be encrypted, which means that the second API request may include the parameters and the metadata required for performing the one or more data transactions with the corresponding candidate application server 107. The corresponding candidate application server 107 may receive the second API request from the one or more source devices 101 through the corresponding unique second endpoint. Upon receiving the second API request, the corresponding candidate application server 107 may validate if the one or more source devices 101 are trusted sources and if the second API request received through the corresponding unique second endpoint is a valid request. In some non-limiting embodiments or aspects, the corresponding candidate application server 107 may perform the validation by initially retrieving the intimation information 209 related to the corresponding candidate application server 107 from the polling database 105 associated with the polling service system 103. In some non-limiting embodiments or aspects, retrieving the intimation information 209 related to the corresponding candidate application server 107 means that the candidate application server 107 may retrieve only the intimation information 209 relevant for the corresponding candidate application server 107 among all other intimation information stored in the polling database 105 for other candidate application servers. In some non-limiting embodiments or aspects, the corresponding candidate application server 107 may access the polling database 105 for retrieving the intimation information 209 related to the corresponding candidate application server 107 prior to receiving the second API request from the one or more source devices 101, which means the candidate application server 107 may be anticipating to receive the second API request from the one or more source devices 101 until the indicated time according to the timeout parameter expiration. In some non-limiting embodiments or aspects, using the intimation information 209, the corresponding candidate application server 107 may access the unique transaction token provided to the one or more source devices 101 for validation purposes, and at least one of the identifier of the one or more source devices 101, details of the unique second endpoint provided to the one or more source devices 101, the identifier of the corresponding candidate application server 107 that the one or more source devices 101 are allowed to access through the unique second endpoint, action code, the preaddress ID, a timeout parameter, and the like. In some non-limiting embodiments or aspects, upon accessing the intimation information 209 in the polling database 105, the corresponding candidate application server 107 may compare the intimation information 209 with a corresponding unique transaction token present in the second API request of the one or more source devices 101 to determine a match. In some non-limiting embodiments or aspects, the corresponding candidate application server 107 may perform one of accepting or rejecting the second API request if the comparison determines the match or a mismatch, respectively. As an example, if the unique transaction token received in the second API request from the one or more source devices 101 matches with the unique transaction token accessed from the intimation information 209, the corresponding candidate application server 107 may accept the second API request. However, if the unique transaction token received in the second API request from the one or more source devices 101 does not match with the unique transaction token accessed from the intimation information 209, the corresponding candidate application server 107 may reject the second API request. Additionally, as per the timeout parameter present in the intimation information, the unique second endpoint is valid only for the time period mentioned in the timeout parameter, for example, 15 minutes. If the corresponding candidate application server 107 determines that the second API request is received upon expiry of the time period indicated by the timeout parameter, then the second API request may be considered as an invalid request and may reject the second API request. In some non-limiting embodiments or aspects, the corresponding candidate application server 107 may perform the validation based on other parameters present in the intimation information 209 such as device ID, device score, geographic location, and the like, along with the unique transaction token. In some non-limiting embodiments or aspects, the candidate application server 107 may decrypt the encrypted dynamic payload of the second API request using the encryption key which is accessed as part of the intimation information 209 from the polling database 105.

In some non-limiting embodiments or aspects, accepting the second API request from the one or more source devices 101 indicates that the one or more source devices 101 requesting to communicate with the corresponding candidate application server 107 using the unique second endpoint are trusted sources and also that the second API request is a valid request.

In some non-limiting embodiments or aspects, upon successful validation, the corresponding candidate application server 107 may transmit a second response to the one or more source devices 101 through the corresponding unique second endpoint. In some non-limiting embodiments or aspects, the second response may be generated by the corresponding candidate application server 107 upon performing the one or more data transactions. As an example, the one or more data transactions may include, but are not limited to, data retrieval, modification of data elements, addition of data elements, deletion of data elements, and replacement of data elements. In some non-limiting embodiments or aspects, the corresponding candidate application server 107 may perform the one or more data transactions indicated by the one or more source devices 101. In some non-limiting embodiments or aspects, the one or more data transactions may be indicated by the one or more source devices 101 in the first API request, which is stored as part of the intimation information 209 in the polling database 105 for the corresponding candidate application server 107 to access and retrieve. Alternatively, the one or more data transactions may be indicated by the one or more source devices 101 in the second API request transmitted to the corresponding candidate application server 107. As an example, the one or more data transactions to be performed may be indicated by the one or more source devices 101 via the action code in the first API request and/or in the second API request.

Henceforth, the process of providing the dynamic endpoints for performing data transactions is explained with one or more exemplary scenarios. However, this should not be construed as a limitation of the present disclosure.

Figure 2F:
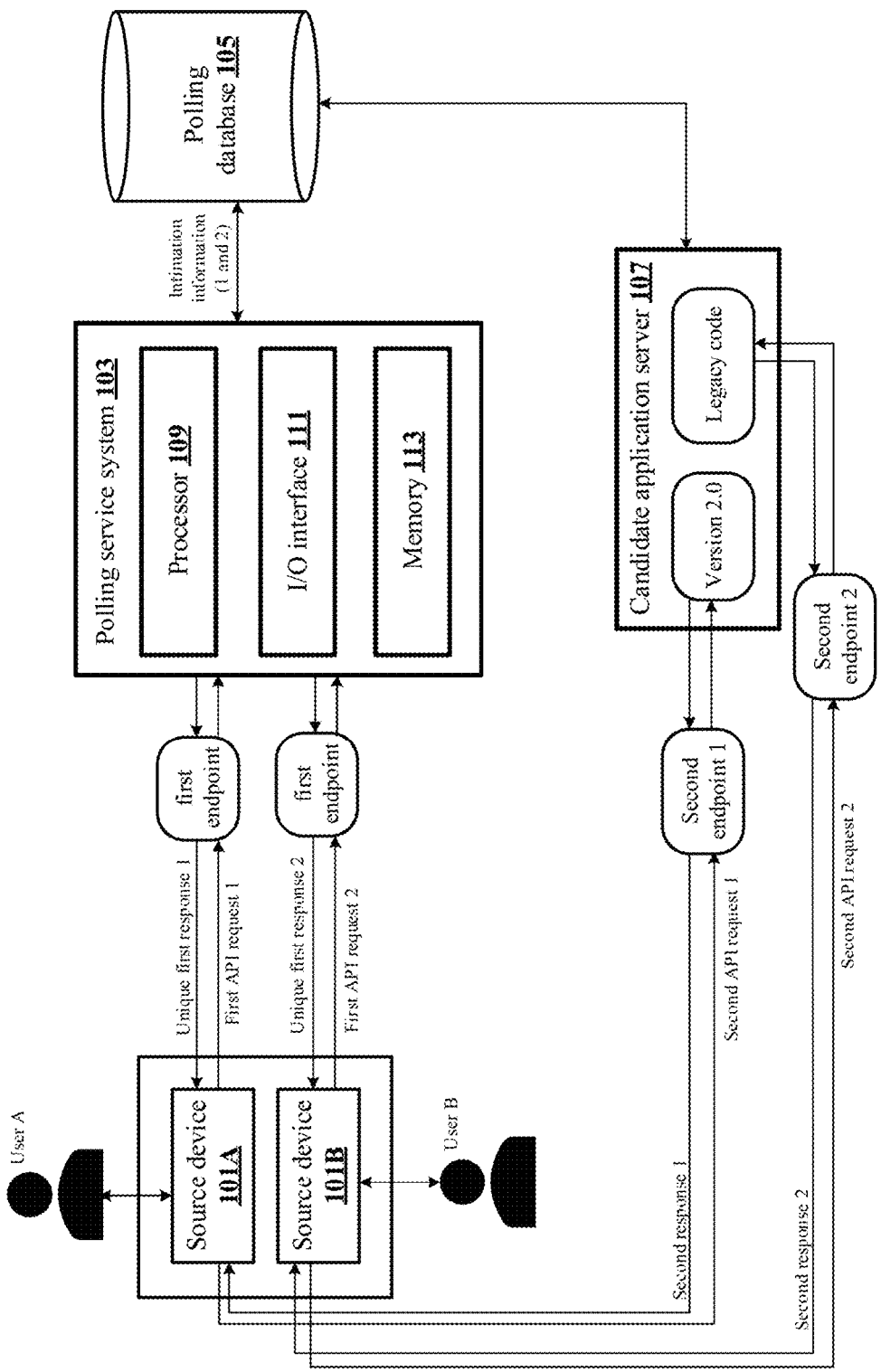
FIG. 2F is an exemplary scenario for providing dynamic endpoints for performing data transactions, in accordance with some non-limiting embodiments or aspects of the present disclosure.

Consider an exemplary scenario as shown in FIG. 2F where user A and user B wish to perform a data transaction with the candidate application server 107. Further, consider that user A is using source device 101A from a geographic location in "Bangalore" and user B is using source device 101B from a geographic location in "Hyderabad". Initially, user A and user B send a first API request 1 and a first API request 2 through a first endpoint, wherein the first endpoint corresponds to the polling service system 103. As an example, the first API request 1 sent by user A may be as shown in FIG. 2G. As an example, the first API request 2 sent by user B may be as shown in FIG. 2H.

Upon receiving the first API requests 1 and 2 (collectively referred as first API requests) from user A and user B, the polling service system 103 may initially validate to check if the transaction is from legitimate users and source devices. Upon successfully validating, the polling service system 103 may parse the first API requests to identify the requirement of the source devices 101A and 101B. Thereafter, based on the product ID, the action code, and preaddress ID provided in the first API requests, the polling service system 103 determines the candidate application and candidate application server 107 with which the source devices 101A and 101B wish to communicate and the data transaction that the source devices 101A and 101B wish to perform with the candidate application server 107. Further, based on the device type and device ID provided in the first API requests, the polling service system 103 determines if the source devices 101A and 101B are capable of handling such requirements, which means capable of performing such data transactions with the candidate application of the candidate application server 107. In this scenario, both the source devices 101A and 101B are capable of supporting the data transactions, and hence the polling service system 103 generates a unique second endpoint for each of the source devices 101A and 101B to communicate with the candidate application server 107, for example, unique second endpoints 1 and 2. Further, the polling service system 103 checks the geographic location of the source devices 101A and 101B from where the first API requests are received. According to the predefined rules stored in the polling service system 103, the first 1000 requests that are received from the geographic location "Bangalore" should be allowed to access the new version, for example, version 2.0 of the candidate application, to communicate with the candidate application server 107. Accordingly, the polling service system 103 generates two unique first responses, for example, unique first response 1 and unique first response 2 (collectively referred as unique first responses) for the source devices 101A and 101B and transmits the unique first responses 1 and 2 to the corresponding source devices 101A and 101B. The unique first response 1 generated for the source device 101A may be as shown in FIG. 2I.

The unique first response 2 generated for the source device 101B may be as shown in FIG. 2J. The unique first responses thus received may be used by the source devices 101A and 101B to generate a second API request 1 and a second API request 2 (collectively referred as second API requests), respectively. The second API request 1 generated by source device 101A may be as shown in FIG. 2K. The second API request 2 generated by source device 101B may be as shown in FIG. 2L. Both source devices 101A and 101B encrypt the dynamic payload which forms the second API requests. The second API requests posting encryption using the encryption key received from the polling service system 103 may be as shown in FIG. 2M and FIG. 2N, respectively.

The source devices 101A and 101B then transmit the second API requests with the encrypted payload to the candidate application server 107. The candidate application server 107 may access and retrieve intimation information 209 from the polling database 105, which is then used to validate if the second API requests are from trusted sources, and if the second API requests received through the corresponding unique second endpoints are valid requests. In this case, the candidate application server 107 successfully validates the source devices 101A and 101B, and also the second API requests received from source devices 101A and 101B, and hence proceeds to perform the data transactions as indicated by the action code specified in the intimation information 209. In this scenario, consider the data transaction performed between source device 101A and the candidate application server 107 is that of the addition of data elements, and the data transaction performed between source device 101B and the candidate application server 107 is that of the retrieval of requested data. Upon performing the data transaction, the candidate application server 107 sends a second responses 1 and 2 to the source devices 101A and 101B, respectively. In this scenario, second response 1 for the source device 101A may be an acknowledgement after adding the data elements, whereas the second response 2 for the source device 101B may be retrieved data as requested by the source device 101B.

Figure 3:
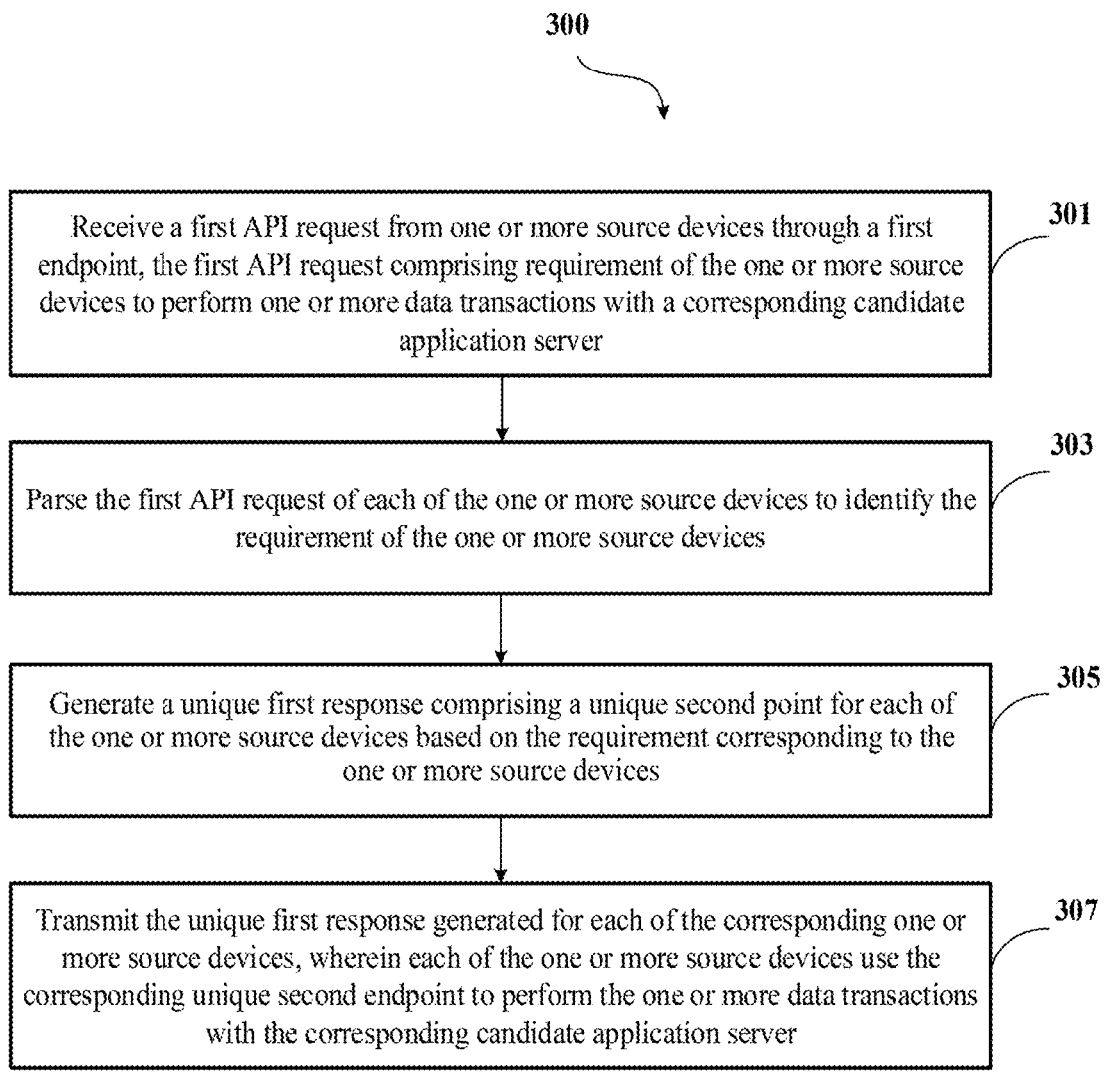
FIG. 3 is a flow chart illustrating method steps for providing dynamic endpoints for performing data transactions, in accordance with some non-limiting embodiments or aspects of the present disclosure.

FIG. 3 shows a flow chart illustrating a method 300 of providing dynamic endpoints for performing data transactions, in accordance with some non-limiting embodiments or aspects of the present disclosure.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of a polling service system 103, a first API request from one or more source devices 101 through a first endpoint. In some non-limiting embodiments or aspects, the first API request indicates the requirement of the one or more source devices 101 to perform one or more data transactions with a corresponding candidate application server 107. In some non-limiting embodiments or aspects, the first API request may include, but is not limited to, at least one of a device Identifier (ID) of the one or more source devices 101, an IP address associated with the one or more source devices 101, latitude and longitude associated with the IP address, device score, device type, an initial base token, product ID, action code, user ID, pre-address ID, and metadata required to complete the one or more data transactions.

At block 303, the method 300 may include parsing, by the processor 109, the first API request of each of the one or more source devices 101 to identify the requirement of the one or more source devices 101.

At block 305, the method 300 may include generating, by the processor 109, a unique first response for each of the one or more source devices 101 based on the requirement corresponding the one or more source devices 101. In some non-limiting embodiments or aspects, the unique first response generated for each of the one or more source devices 101 may include a unique second endpoint that facilitates the one or more data transactions with the corresponding candidate application server 107. In some non-limiting embodiments or aspects, the unique first response may further include, but is not limited to, at least one of the parameters required for performing the one or more data transactions with the corresponding candidate application server 107, a unique transaction token for validation purposes, an encryption key, and one or more input fields for an API call. In some non-limiting embodiments or aspects, the processor 109 may validate the one or more source devices 101 based on information in the first API request prior to generation of the unique first response. In some non-limiting embodiments or aspects, the processor 109 may dynamically generate the unique second endpoint in response to each of the first API requests based on one or more predefined rules. The one or more predefined rules may be related to at least one of a version of a corresponding candidate application facilitating the corresponding candidate application server 107, criticality of the requirement of the one or more source devices 101, geographic location of the one or more source devices 101, and validity time of the unique second endpoint. In some non-limiting embodiments or aspects, the processor 109 may store intimation information 209 corresponding to each of the generated unique first response in a polling database 105 associated with the polling service system 103. The intimation information 209 may include, but is not limited to, a transaction token provided to the one or more source devices 101 for validation purposes, and at least one of an identifier of the one or more source devices 101, details of the unique second endpoint to be provided to the one or more source devices 101, and an identifier of the corresponding candidate application server 107 that the one or more source devices 101 are allowed to access through the unique second endpoint.

At block 307, the method 300 may include transmitting, by the processor 109, the unique first response generated for each of the corresponding one or more source devices 101. In some non-limiting embodiments or aspects, each of the one or more source devices 101 use the corresponding unique second endpoint to perform the one or more data transactions with the corresponding candidate application server 107. The one or more source devices 101 may thereafter transmit a second API request to the corresponding candidate application server 107 using the unique second endpoint received from the polling service system 103. In some non-limiting embodiments or aspects, the corresponding candidate application server 107 may receive a second API request from the one or more source devices 101 through the corresponding unique second endpoint. The second API request may include the dynamic payload which may or may not be encrypted, which means that the second API request may include the parameters and the metadata required for performing the one or more data transactions with the corresponding candidate application server 107. Upon receiving the second API request, the corresponding candidate application server 107 may validate if the one or more source devices 101 are trusted sources and if the second API request received through the corresponding unique second endpoint is a valid request. Upon successful validation, the corresponding candidate application server 107 may transmit a second response to the one or more source devices 101 through the corresponding unique second endpoint. In some non-limiting embodiments or aspects, the second response may be generated upon performing the one or more data transactions. As an example, the one or more data transactions may include, but is not limited to, data retrieval, modification of data elements, addition of data elements, deletion of data elements, and replacement of data elements. In some non-limiting embodiments or aspects, the second response may be related to the one or more data transactions that may include, but are not limited to, data retrieval, modification of data elements, addition of data elements, deletion of data elements, and replacement of data elements. As an example, if the data transaction is a data retrieval action, the corresponding candidate application server 107 may provide a second response comprising data requested by the one or more source devices 101. As an example, if the data transaction is related to the addition of data elements, the corresponding candidate application server 107 may add/append the data elements to existing data associated with the corresponding candidate application server 107 and may provide an acknowledgement of such an addition as the second response to the one or more data transactions.

The present disclosure eliminates dependency of using a single endpoint by every consumer in the external environment, which is prone to attacks, by providing two stages: a polling phase and a transaction phase. The polling phase provides a dynamic endpoint for the one or more source devices 101 to communicate with the corresponding candidate application server 107. Generally, there is no separate polling phase which provides a dynamic endpoint to interact with the corresponding candidate application 107 server. Rather, any source device could interact with the corresponding candidate application server 107 using a static endpoint. Since such a static endpoint is extensively used to interact with a particular candidate application server, and is well known to users around the world, such static endpoints are exposed to threats of interception of outgoing requests in the one or more source devices 101, thereby compromising on data security. In the present disclosure, since the polling phase is introduced to provide a dynamic endpoint, the same candidate application server is represented with different dynamic endpoints for different requests. Therefore, it would not be possible for the attackers to understand the destination of the dynamic endpoint, which means attackers would not be able to understand which candidate application server is being addressed using the dynamic endpoint. Also, such a dynamic endpoint is associated with a timeout period, which means the dynamic endpoint is valid only for a certain time period, within which the one or more source devices 101 need to interact with the corresponding candidate application server 107 for performing the data transactions. The timeout period may also be set dynamically and may be different for different requests. Moreover, the dynamic endpoint is validated in real-time by the corresponding candidate application server 107 based on the intimation information provided by the polling service system to the corresponding candidate application server 107. Therefore, the corresponding candidate application server 107 is well aware of the type of device which would be communicating through which endpoint, even before receiving the request from the one or more source devices 101. Therefore, such a dynamic endpoint which is time bound and validated in real-time is very difficult to be hacked or predicted, thereby reducing the interception of outgoing requests in the source device, and in turn enhancing the data security.

Further, in the present disclosure, the dynamic endpoint is used for diverting the one or more source devices 101 to interact with new versions of the candidate application. The present disclosure achieves the same by using predefined rules. For instance, all of the API requests coming from a certain geographic location are addressed to version 2 of the corresponding candidate application and the rest of the legacy code of the corresponding candidate application. Therefore, such a dynamic endpoint combined with predefined rules ensures that some amount of API requests can be addressed to newer versions of the corresponding candidate application, hence allowing the developers to test the newer versions of the corresponding candidate application with few users in real-time without impacting or disturbing the overall working of the legacy code. Therefore, the present disclosure provides a mechanism to ensure testing of different versions developed for a legacy code, which in turn can help in appending the new version to the existing legacy code, or replace the legacy code with the new version and the like. This in turn helps the users to use new features, security updates, and the like over the existing legacy codes. Therefore, the present disclosure enables real-time testing of the different versions of the legacy code on incremental basis based on predefined rules.

Figure 4:
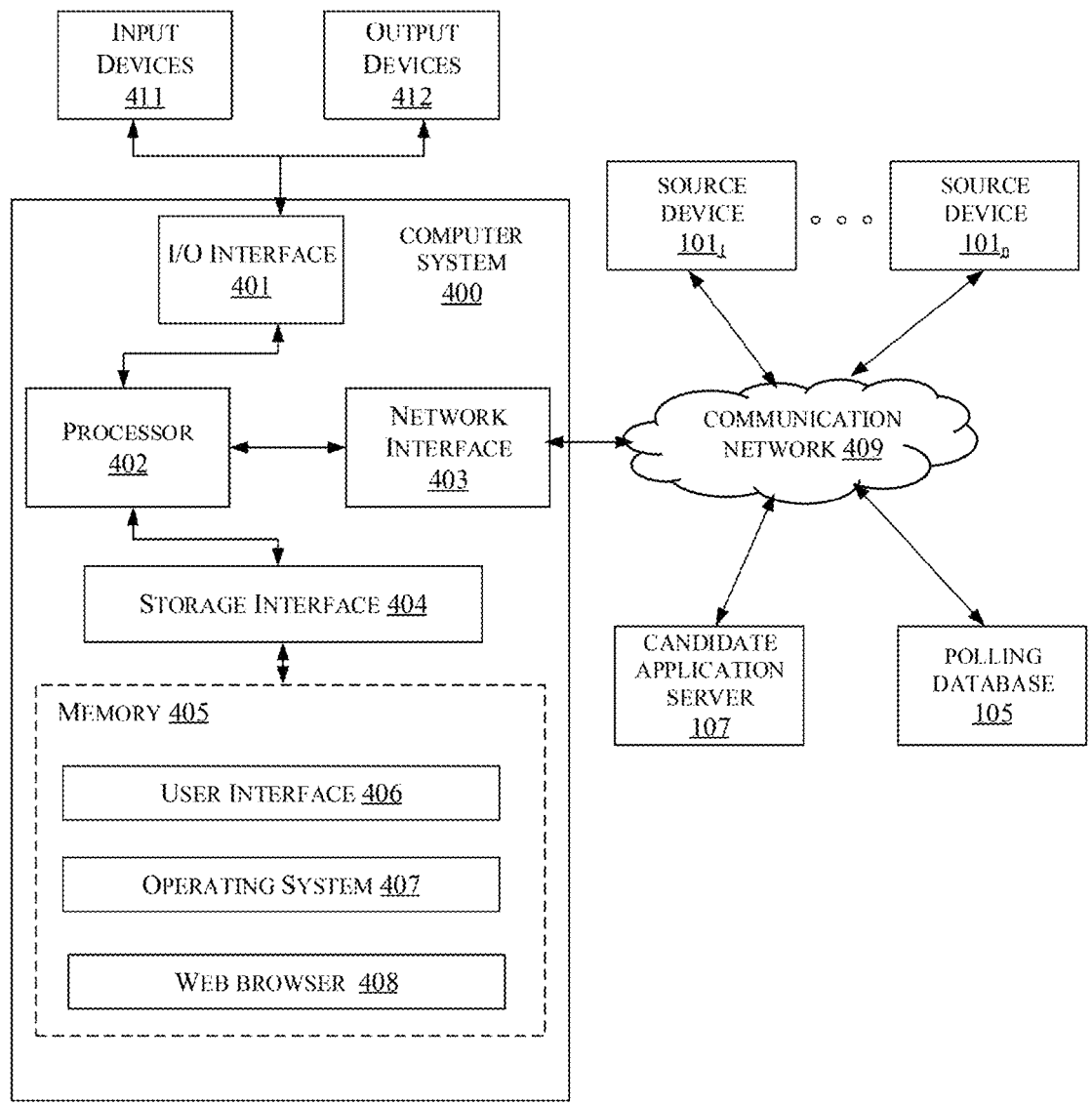
FIG. 4 is a block diagram of an exemplary computer system for implementing embodiments consistent with the present disclosure.

FIG. 4 is a block diagram of an exemplary computer system for implementing embodiments consistent with the present disclosure.

In some non-limiting embodiments or aspects, FIG. 4 illustrates a block diagram of an exemplary computer system 400 for implementing embodiments consistent with the present disclosure. In some non-limiting embodiments or aspects, the computer system 400 can be a polling service system 103 that is used for providing dynamic endpoints for performing data transactions. In some other embodiments, the computer system 400 can be a candidate application server 107. The computer system 400 may include a central processing unit ("CPU" or "processor") 402. The processor 402 may include at least one data processor for executing program components for executing user- or system-generated business processes. A user may include a person, a person using a device such as those included in this disclosure, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via an I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth®, cellular (e.g., Code-Division Multiple Access (CDMA), High-Speed Packet Access (HSPA+), Global System For Mobile Communications (GSM), Long-Term Evolution (LTE), WiMax®, or the like), etc. Using the I/O interface 401, the computer system 400 may communicate with the input devices 411 and the output devices 412.

In some non-limiting embodiments or aspects, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more source devices $101_1$ to $101_n$ parallelly, a polling database 105, and a candidate application server 107. The communication network 409 can be implemented as one of the different types of networks, such as intranet or Local Area Network (LAN), Closed Area Network (CAN), and such. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices including routers, bridges, servers, computing devices, storage devices, etc. In some non-limiting embodiments or aspects, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, USB, fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components including, without limitation, a user interface 406, an operating system 407, a web browser 408, etc. In some non-limiting embodiments or aspects, the computer system 400 may store user/application data, such as the data, variables, records, etc., as described in this disclosure. Such databases may be implemented as fault-tolerant, relational, scalable, and/or secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some non-limiting embodiments or aspects, the computer system 400 may implement web browser stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some non-limiting embodiments or aspects, the computer system 400 may implement a mail server stored program component. The mail server may be an Internet mail server such as Microsoft Exchange or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some non-limiting embodiments or aspects, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, for example, non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The described operations may be implemented as a method, system, or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer-readable medium and/or hardware logic in which code may be implemented. A device in which the code implementing the described embodiments of operations is encoded may include a computer-readable medium or hardware logic. Of course, those skilled in the art will recognize that many modifications may be made to this configuration without departing from the scope of the disclosure and that the article of manufacture may include suitable information bearing medium known in the art.

The terms "some non-limiting embodiments or aspects", "embodiment", "embodiments", "the embodiment", "the embodiments", "one or more embodiments", "some-non-limiting embodiments or aspects", and "some non-limiting embodiments or aspects" mean "one or more (but not all) embodiments of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations of FIG. 3 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

A description of some non-limiting embodiments or aspects with several components in communication with each other does not imply that all such components are required. On the contrary, a variety of optional components is described to illustrate the wide variety of possible embodiments of the disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
receiving, by a polling service system, a first Application Programming Interface (API) request from one or more source devices through a first endpoint, wherein the first API request indicates requirement of the one or more source devices to perform one or more data transactions with a corresponding candidate application server;
parsing, by the polling service system, the first API request of each of the one or more source devices to identify the requirement of the one or more source devices;
generating, by the polling service system, a unique first response for each of the one or more source devices based on the requirement corresponding to the one or more source devices, wherein the unique first response generated for each of the one or more source devices comprises a unique second endpoint that facilitates the one or more data transactions with the corresponding candidate application server; and
transmitting, by the polling service system, the unique first response generated for each of the corresponding one or more source devices, wherein each of the one or more source devices use the corresponding unique second endpoint to perform the one or more data transactions with the corresponding candidate application server;
wherein the unique first response further comprises at least one of the following: parameters required for performing the one or more data transactions with the corresponding candidate application server and a unique transaction token for validation purposes, an encryption key, one or more input fields for an API call, or any combination thereof; and wherein the unique second endpoint is dynamically generated in response to each of the first API requests based on one or more predefined rules, wherein the one or more predefined rules are related to at least one of the following: a version of a corresponding candidate application facilitating the corresponding candidate application server, criticality of the requirement of the one or more source devices, geographic location of the one or more source devices, validity time of the unique second endpoint, or any combination thereof.

2. The computer-implemented method of claim 1, wherein the one or more source devices are validated prior to generation of the unique first response.

3. The computer-implemented method of claim 1, further comprising storing, by the polling service system, intimation information corresponding to each of the generated unique first responses, wherein the intimation information comprises a unique transaction token provided to the one or more source devices for validation purposes, and at least one of the following: an identifier of the one or more source devices, details of the unique second endpoint to be provided to the one or more source devices, an identifier of the corresponding candidate application server that the one or more source devices are allowed to access through the unique second endpoint, or any combination thereof.

4. The computer-implemented method of claim 1, wherein the first API request comprises at least one of the following: a device Identifier (ID) of the one or more source devices, an Internet Protocol (IP) address associated with the one or more source devices, latitude and longitude associated with the IP address, a device score, a device type, an initial base token, a product ID, action code, user ID, pre-address ID, metadata required to complete the one or more data transactions, or any combination thereof.

5. The computer-implemented method of claim 1, further comprising:
   receiving, by the corresponding candidate application server, a second API request from the one or more source devices through the corresponding unique second endpoint, wherein the second API request comprises parameters and metadata required for performing the one or more data transactions with the corresponding candidate application server;
   validating, by the corresponding candidate application server:
      if the one or more source devices are trusted sources, and
      if the second API request received through the corresponding unique second endpoint is a valid request; and
   transmitting, by the corresponding candidate application server, upon successful validation, a second response to the one or more source devices, through the corresponding unique second endpoint, wherein the second response is generated upon performing the one or more data transactions comprising at least one of the following: data retrieval, modification of data elements, addition of data elements, deletion of data elements, replacement of data elements, or any combination thereof, and wherein the second response comprises at least one of acknowledgement related to the one or more data transactions and data related to the one or more data transactions.

6. The computer-implemented method of claim 5, wherein the validating comprises:

retrieving, by the corresponding candidate application server, intimation information related to the corresponding candidate application server from a polling database associated with the polling service system; and comparing, by the corresponding candidate application server, the intimation information with a corresponding unique transaction token present in the second API request of the one or more source devices to determine a match.

7. The computer-implemented method of claim 6, further comprising performing one of accepting or rejecting, by the corresponding candidate application server, the second API request, if the comparison determines the match or a mismatch, respectively.

8. A polling service system comprising:
   a processor; and
   a memory communicatively coupled to the processor, wherein the memory stores processor instructions, which, on execution, causes the processor to:
      receive a first Application Programming Interface (API) request from one or more source devices through a first endpoint, wherein the first API request indicates requirement of the one or more source devices to perform one or more data transactions with a corresponding candidate application server;
      parse the first API request of each of the one or more source devices to identify the requirement of the one or more source devices;
      generate a unique first response for each of the one or more source devices based on the requirement corresponding to the one or more source devices, wherein the unique first response generated for each of the one or more source devices comprises a unique second endpoint that facilitates the one or more data transactions with the corresponding candidate application server; and
      transmit the unique first response generated for each of the corresponding one or more source devices, wherein each of the one or more source devices use the corresponding unique second endpoint to perform the one or more data transactions with the corresponding candidate application server;
   wherein the unique first response further comprises at least one of the following: parameters required for performing the one or more data transactions with the corresponding candidate application server and a unique transaction token for validation purposes, an encryption key, one or more input fields for an API call, or any combination thereof; and
   wherein the unique second endpoint is dynamically generated in response to each of the first API requests based on one or more predefined rules, wherein the one or more predefined rules are related to at least one of the following: a version of a corresponding candidate application facilitating the corresponding candidate application server, criticality of the requirement of the one or more source devices, geographic location of the one or more source devices, validity time of the unique second endpoint, or any combination thereof.

9. The polling service system of claim 8, wherein the one or more source devices are validated prior to generation of the unique first response.

10. The polling service system of claim 8, wherein the processor is further configured to store intimation information corresponding to each of the generated unique first responses, wherein the intimation information comprises a unique transaction token provided to the one or more source devices for validation purposes, and at least one of the following: an identifier of the one or more source devices, details of the unique second endpoint to be provided to the one or more source devices, an identifier of the corresponding candidate application server that the one or more source devices are allowed to access through the unique second endpoint, or any combination thereof.

11. The polling service system of claim 8, wherein the processor generates the unique second endpoint dynamically in response to each of the first API requests based on one or more predefined rules, wherein the one or more predefined rules are related to at least one of the following: a version of a corresponding candidate application facilitating the corresponding candidate application server, criticality of the requirement of the one or more source devices, geographic location of the one or more source devices, validity time of the unique second endpoint, or any combination thereof.

12. The polling service system of claim 8, wherein the first API request comprises at least one of the following: a device Identifier (ID) of the one or more source devices, an Internet Protocol (IP) address associated with the one or more source devices, latitude and longitude associated with the IP address, a device score, a device type, an initial base token, a product ID, action code, user ID, pre-address ID, metadata required to complete the one or more data transactions, or any combination thereof.

13. The polling service system of claim 8, wherein the corresponding candidate application server associated with the polling service system is configured to:
  receive a second API request from the one or more source devices through the corresponding unique second endpoint, wherein the second API request comprises parameters and metadata required for performing the one or more data transactions with the corresponding candidate application server;
  validate:
    if the one or more source devices are trusted sources, and
    if the second API request received through the corresponding unique second endpoint is a valid request; and
  transmit, upon successful validation, a second response to the one or more source devices, through the corresponding unique second endpoint, wherein the second response is generated upon performing the one or more data transactions comprising at least one of the following: data retrieval, modification of data elements, addition of data elements, deletion of data elements, replacement of data elements, or any combination thereof, and wherein the second response comprises at least one of acknowledgement related to the one or more data transactions and data related to the one or more data transactions.

14. The polling service system of claim 13, wherein, to validate, the corresponding candidate application server is configured to:
  retrieve intimation information related to the corresponding candidate application server from a polling database associated with the polling service system; and
  compare the intimation information with a corresponding unique transaction token present in the second API request of the one or more source devices to determine a match.

15. The polling service system of claim 14, wherein the corresponding candidate application server performs one of accepting or rejecting the second API request if the comparison determines the match or a mismatch, respectively.

16. A non-transitory computer-readable medium including instructions stored thereon that when processed by at least one processor, causes a polling service system to perform operations comprising:
  receiving a first Application Programming Interface (API) request from one or more source devices through a first endpoint, wherein the first API request indicates requirement of the one or more source devices to perform one or more data transactions with a corresponding candidate application server;
  parsing the first API request of each of the one or more source devices to identify the requirement of the one or more source devices;
  generating a unique first response for each of the one or more source devices based on the requirement corresponding to the one or more source devices, wherein the unique first response generated for each of the one or more source devices comprises a unique second endpoint that facilitates the one or more data transactions with the corresponding candidate application server; and
  transmitting the unique first response generated for each of the corresponding one or more source devices, wherein each of the one or more source devices use the corresponding unique second endpoint to perform the one or more data transactions with the corresponding candidate application server;
  wherein the unique first response further comprises at least one of the following: parameters required for performing the one or more data transactions with the corresponding candidate application server and a unique transaction token for validation purposes, an encryption key, one or more input fields for an API call, or any combination thereof; and
  wherein the unique second endpoint is dynamically generated in response to each of the first API requests based on one or more predefined rules, wherein the one or more predefined rules are related to at least one of the following: a version of a corresponding candidate application facilitating the corresponding candidate application server, criticality of the requirement of the one or more source devices, geographic location of the one or more source devices, validity time of the unique second endpoint, or any combination thereof.

17. The medium of claim 16, wherein the instructions cause the corresponding candidate application server associated with the polling service system to:
  receive a second API request from the one or more source devices through the corresponding unique second endpoint, wherein the second API request comprises parameters and metadata required for performing the one or more data transactions with the corresponding candidate application server;
  validate:
    if the one or more source devices are trusted sources, and
    if the second API request received through the corresponding unique second endpoint is a valid request; and
  transmit, upon successful validation, a second response to the one or more source devices through the corresponding unique second endpoint, wherein the second response is generated upon performing the one or more data transactions comprising at least one of the following: data retrieval, modification of data elements, addition of data elements, deletion of data elements, replacement of data elements, or any combination thereof.

\* \* \* \* \*